United States Patent [19]

Takahara

[11] Patent Number: 5,408,064
[45] Date of Patent: Apr. 18, 1995

[54] PULSE GENERATING METHOD AND APPARATUS

[75] Inventor: Kunihiro Takahara, Yokohama, Japan

[73] Assignee: Sodick Co., Ltd., Yokohama, Japan

[21] Appl. No.: 838,306

[22] PCT Filed: Jun. 19, 1991

[86] PCT No.: PCT/JP91/00823
§ 371 Date: May 5, 1992
§ 102(e) Date: May 5, 1992

[87] PCT Pub. No.: WO92/00826
PCT Pub. Date: Jan. 23, 1992

[30] Foreign Application Priority Data

Jul. 13, 1990 [JP] Japan .................. 2-185743

[51] Int. Cl.6 .............................. B23H 7/20
[52] U.S. Cl. .................. 219/69.18; 219/69.13; 323/283; 364/474.04
[58] Field of Search ......... 219/69.18, 69.13, 130.21, 219/130.33; 364/474.04; 323/283, 292, 322

[56] References Cited

U.S. PATENT DOCUMENTS

| | | | |
|---|---|---|---|
| 3,705,286 | 12/1972 | Kondo et al. | 219/69.13 |
| 4,071,729 | 1/1978 | Bell, Jr. | 219/69.13 |
| 4,128,771 | 12/1978 | Domonico | 323/283 |
| 4,320,279 | 3/1982 | Bell, Jr. et al. | 219/69.18 |
| 4,356,542 | 10/1982 | Bruckner et al. | 323/283 |
| 4,361,745 | 11/1982 | Rupert et al. | 219/69.13 |
| 4,370,536 | 1/1983 | Kruth | 219/69.18 |
| 4,392,043 | 7/1983 | Inoue | 219/69.18 |
| 4,673,791 | 6/1987 | Kenno et al. | 219/69.13 |
| 4,800,248 | 1/1989 | Futamura et al. | 219/69.18 |
| 4,920,246 | 4/1990 | Aoki | 323/283 |
| 5,149,940 | 9/1992 | Davis et al. | 219/130.21 |
| 5,182,474 | 1/1993 | Kaneko | 219/69.18 |
| 5,233,158 | 8/1993 | Karakama et al. | 219/130.33 |
| 5,254,937 | 10/1993 | Mizoguchi | 323/283 |

FOREIGN PATENT DOCUMENTS

| | | | |
|---|---|---|---|
| 57-89522 | 6/1982 | Japan | 219/69.13 |
| 61-30334 | 2/1986 | Japan | 219/69.13 |
| 63-68318 | 3/1988 | Japan | 219/69.18 |
| 63-180416 | 7/1988 | Japan | 219/69.18 |

OTHER PUBLICATIONS

Translation of Japan, Kokai, 59-169,717 by Otayaki et al., PTO 94-2634.

Primary Examiner—Geoffrey S. Evans
Attorney, Agent, or Firm—Marks & Murase

[57] ABSTRACT

A programmable apparatus for generating machining pulses for an electroerosion machine tool system so that it can be made operable for a plurality of different machining methods, different workpiece materials, and different electrode materials without sacrificing machining performance. The type of data detected at the gap, as well as the manner in which the data is evaluated, may be selected according to the specific requirements of the machining being performed. The on-times and off-times for the machining pulses supplied to the gap are independently programmable and controlled for generating pulses having an optimal pulse width. The peak current may also be independently programmable and controlled. The programmed data may be updated during machining automatically or by operator input. Consequently, through the use of different programs, a single pulse generator hardware design may be used in a multitude of machining methods without sacrificing machining performance.

21 Claims, 24 Drawing Sheets

| ADDRESS | DATA | |
|---|---|---|
| | CONTENTS | BIT |
| 00 | INITIAL VALUE OF ON TIME | 16 |
| 02 | INITIAL VALUE OF OFF TIME | 16 |
| 5E | USE OF ON TIME CONTROL (0→USE) | 1 |
| 60 | USE OF OFF TIME CONTROL (0→USE) | 1 |
| 08 | INCREMENT OF ON TIME | 16 |
| 0A | DECREMENT OF ON TIME | 16 |
| 0C | UPPER LIMIT OF ON TIME | 16 |
| 0E | LOWER LIMIT OF ON TIME | 16 |
| 24 | INCREMENT OF OFF TIME | 16 |
| 26 | DECREMENT OF OFF TIME | 16 |
| 28 | UPPER LIMIT OF OFF TIME | 16 |
| 2A | LOWER LIMIT OF OFF TIME | 16 |

| ADDRESS | DATA | |
|---|---|---|
| | CONTENTS | BIT |
| 10 | ON TIME CONTROL MODE<br>{ 00:DECREMENT • RESET MODE<br>01:INCREMENT • RESET MODE<br>10:INCREMENT • DECREMENT • RESET MODE } | 2 |
| 12 | ON TIME CONTROL   CONTINUOUS VALUE OF F-SIGNAL | 12 |
| 14 | ON TIME CONTROL   CONTINUOUS VALUE OF B-SIGNAL | 12 |
| 16 | ON TIME CONTROL   SAMPLING TIMES | 12 |
| 18 | ON TIME CONTROL   VALUE OF ACCUMULATIVE F-SIGNALS | 12 |
| 1A | ON TIME CONTROL   VALUE OF ACCUMULATIVE B-SIGNALS | 12 |
| 1C | DECISION MODE IN ON TIME INCREMENT CONTROL<br>* { 00:F-SIGNAL CONTINUOUS-VALUED DECISION MODE<br>01:F-SIGNAL ACCUMULATED DECISION MODE<br>10:B-SIGNAL CONTINUOUS-VALUED DECISION MODE<br>11:B-SIGNAL ACCUMULATED DECISION MODE } | 2 |
| 1E | DECISION MODE IN ON TIME DECREMENT CONTROL (*) | 2 |
| 20 | DECISION MODE IN ON TIME RESET CONTROL     (*) | 2 |
| 22 | POSITION OF ON TIME CHECK PULSE | 16 |
| 2C | OFF TIME CONTROL MODE<br>{ 00:DECREMENT • RESET MODE<br>01:INCREMENT • RESET MODE<br>10:INCREMENT • DECREMENT • RESET MODE } | 2 |
| 2E | OFF TIME CONTROL   CONTINUOUS VALUE OF F-SIGNAL | 12 |
| 30 | OFF TIME CONTROL   CONTINUOUS VALUE OF B-SIGNAL | 12 |
| 32 | OFF TIME CONTROL   SAMPLING TIMES | 12 |
| 34 | OFF TIME CONTROL   VALUE OF ACCUMULATIVE F-SIGNALS | 12 |
| 36 | OFF TIME CONTROL   VALUE OF ACCUMULATIVE B-SIGNALS | 12 |
| 38 | DECISION MODE IN OFF TIME INCREMENT CONTROL (*) | 2 |
| 3A | DECISION MODE IN OFF TIME DECREMENT CONTROL (*) | 2 |
| 3C | DECISION MODE IN OFF TIME RESET CONTROL    (*) | 2 |
| 3E | POSITION OF OFF TIME CHECK PULSE | 16 |

FIG. 3(C)

| ADDRESS | DATA | BIT |
|---|---|---|
| | CONTENTS | |
| 64 | USE OF ON CLAMP (0→USE) | 1 |
| 74 | USE OF INHIBIT SIGNAL (1→USE) | 1 |
| A2 | WIDTH OF INHIBIT SIGNAL | 10 |
| AE | THRESHOLD FOR ON TIME CONTROL | 8 |
| B0 | THRESHOLD FOR OFF TIME CONTROL | 8 |
| BA | DETECTION DATA FOR ON TIME CONTROL (0→PORT A) | 1 |
| BC | DETECTION DATA FOR OFF TIME CONTROL (0→PORT A) | 1 |
| C4 | EVALUATION OF LEVEL IN ON TIME CONTROL<br>** {0:LEVEL HIGHER THAN THRESHOLD IS GOOD<br>1:LEVEL HIGHER THAN THRESHOLD IS NO GOOD} | 1 |
| C6 | EVALUATION OF LEVEL IN OFF TIME CONTROL (**) | 1 |

FIG. 3(D)

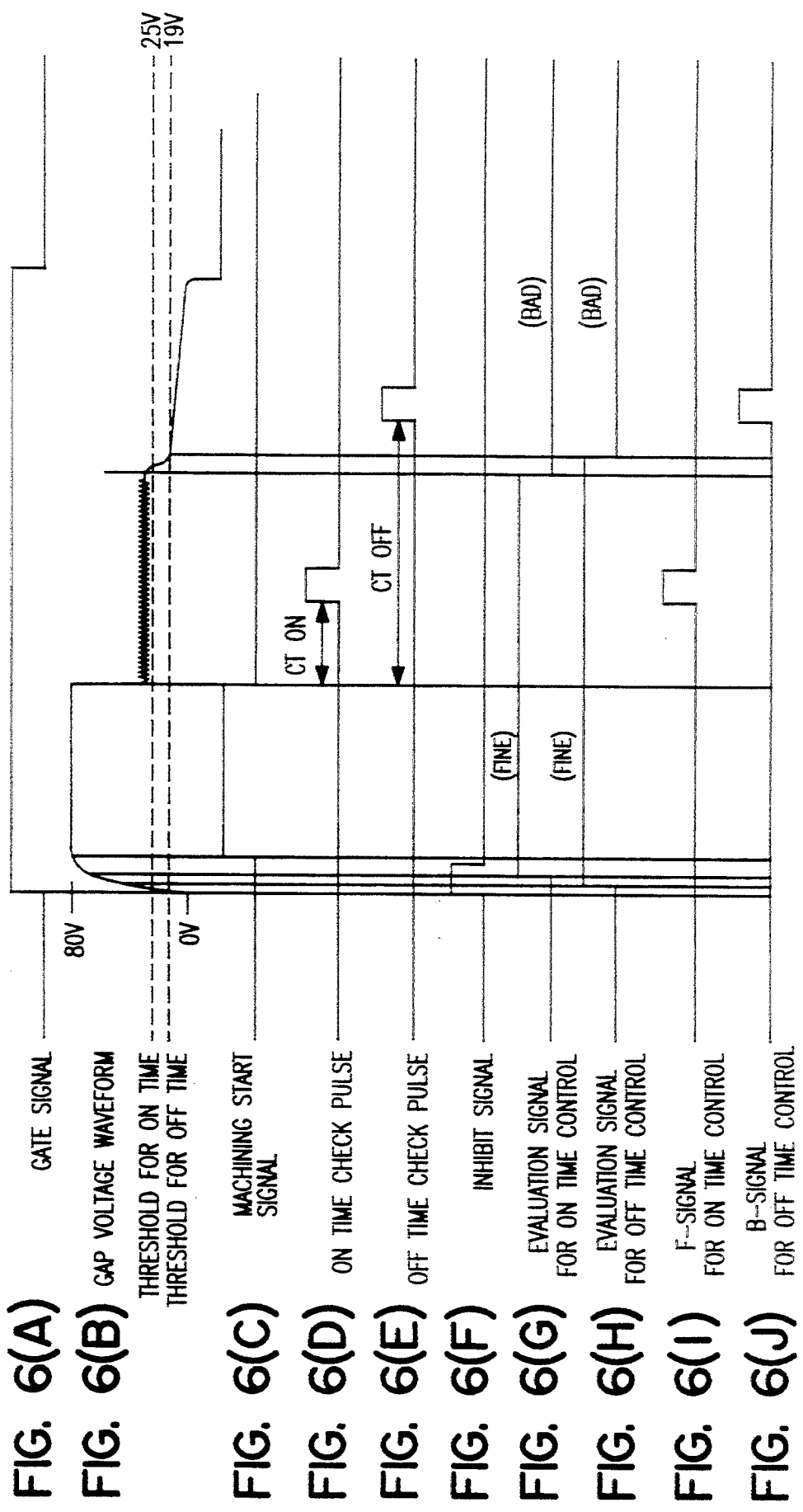

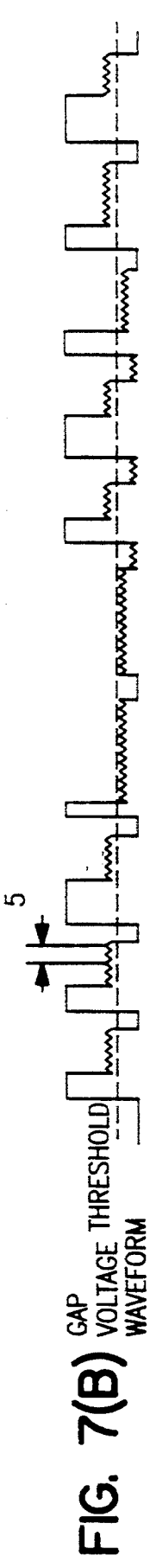
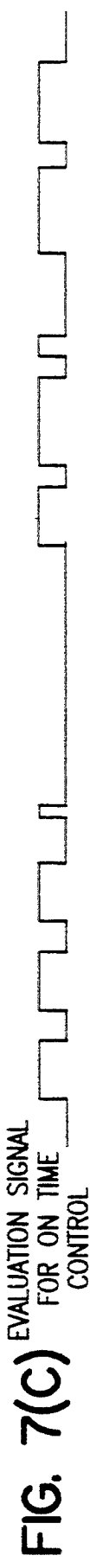
FIG. 7(A) GATE SIGNAL
FIG. 7(B) GAP VOLTAGE THRESHOLD WAVEFORM
FIG. 7(C) EVALUATION SIGNAL FOR ON TIME CONTROL
FIG. 7(D) INHIBIT SIGNAL
FIG. 7(E) ON TIME CHECK PULSE
FIG. 7(F) F-SIGNAL
FIG. 7(G) B-SIGNAL
FIG. 7(H) UP SIGNAL
FIG. 7(I) DO SIGNAL
FIG. 7(J) RE SIGNAL

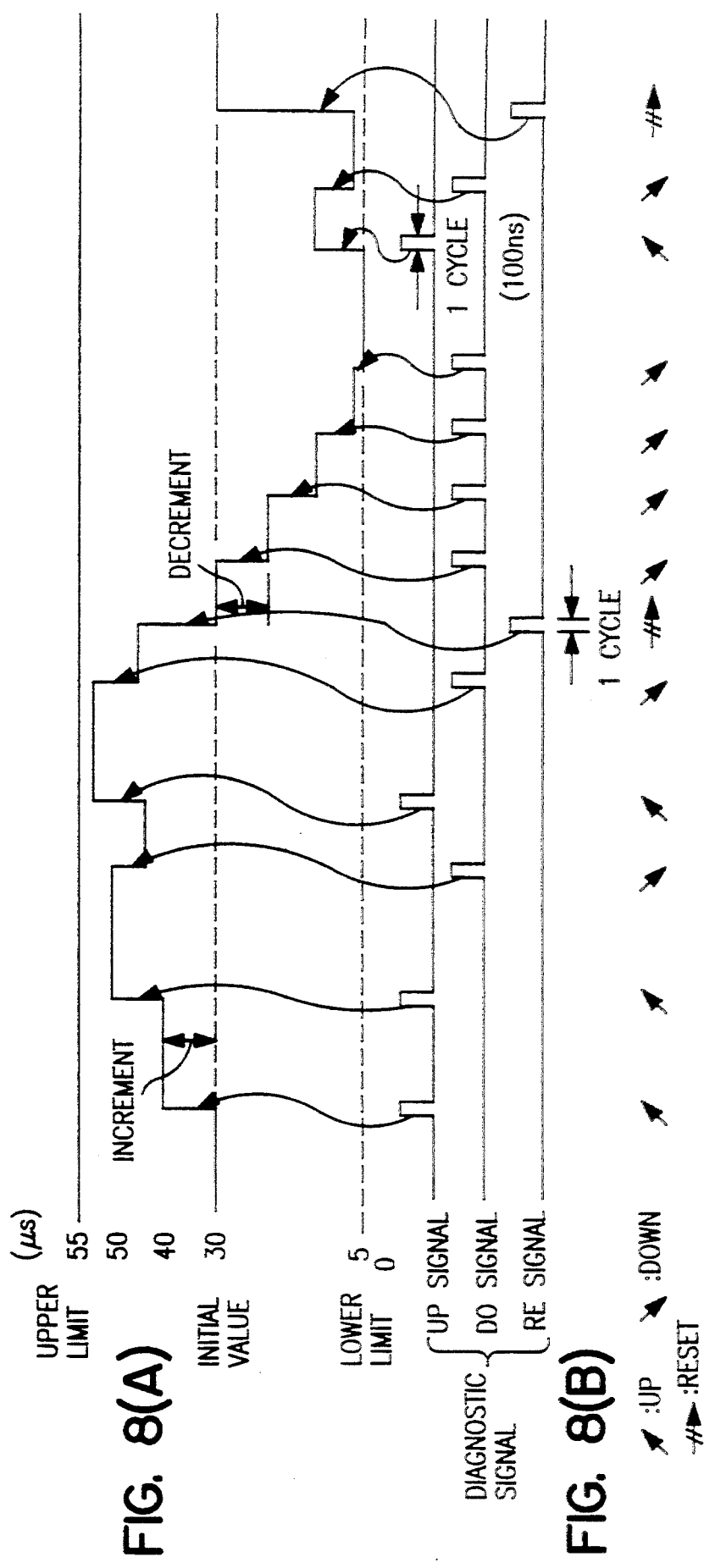

CU-STEEL [1]

| ADD. | 00 | 02 | 5E | 60 | 08 | 0A | 0C | 0E | 24 | 26 | 28 | 2A | | | | | | | | |
|---|---|---|---|---|---|---|---|---|---|---|---|---|---|---|---|---|---|---|---|---|
| SET | 70 | 70 | 0 | 0 | 2 | 5 | 120 | 20 | 100 | 5 | 1000 | 15 | | | | | | | | |

| ADD. | 10 | 12 | 14 | 16 | 18 | 1A | 1C | 1E | 20 | 22 | 2C | 2E | 30 | 32 | 34 | 36 | 38 | 3A | 3C | 3E |
|---|---|---|---|---|---|---|---|---|---|---|---|---|---|---|---|---|---|---|---|---|
| SET | 10 | 10 | 3 | 100 | 2 | 50 | 00 | 10 | 11 | 20 | 10 | 30 | 2 | 100 | | 50 | 10 | 00 | 11 | 15 |

| ADD. | 64 | 74 | A2 | AE | B0 | BA | BC | C4 | C6 |
|---|---|---|---|---|---|---|---|---|---|
| SET | 0 | 1 | 15 | 20 | 20 | 0 | 0 | 0 | 0 |

FIG. 9(A)

CU-TITANIUM [2]

| ADD. | 00 | 02 | 5E | 60 | 08 | 0A | 0C | 0E | 24 | 26 | 28 | 2A | | | | | | | | |
|---|---|---|---|---|---|---|---|---|---|---|---|---|---|---|---|---|---|---|---|---|
| SET | 20 | 20 | 00 | 00 | 1 | 2 | 30 | 5 | 10 | 3 | 100 | 5 | | | | | | | | |

| ADD. | 10 | 12 | 14 | 16 | 18 | 1A | 1C | 1E | 20 | 22 | 2C | 2E | 30 | 32 | 34 | 36 | 38 | 3A | 3C | 3E |
|---|---|---|---|---|---|---|---|---|---|---|---|---|---|---|---|---|---|---|---|---|
| SET | 10 | 10 | 2 | 50 | 1 | 25 | 00 | 10 | 11 | 5 | 10 | 20 | 1 | 50 | | 20 | 10 | 00 | 11 | 5 |

| ADD. | 64 | 74 | A2 | AE | B0 | BA | BC | C4 | C6 |
|---|---|---|---|---|---|---|---|---|---|
| SET | 0 | 1 | 15 | 15 | 15 | 0 | 0 | 0 | 0 |

FIG. 9(B)

| ADDRESS | DATA | |
|---|---|---|
| | CONTENTS | BIT |
| 40 | INITIAL VALUE OF Ip | 12 |
| 76 | USE OF Ip CONTROL | 1 |
| 42 | INCREMENT OF Ip | 16 |
| 44 | DECREMENT OF Ip | 16 |
| 46 | UPPER LIMIT OF Ip | 16 |
| 48 | LOWER LIMIT OF Ip | 16 |

FIG. 12(A)

| ADDRESS | DATA | |
|---|---|---|
| | CONTENTS | BIT |
| 4A | Ip CONTROL MODE | 2 |
| 4C | Ip CONTROL CONTINUOUS VALUE OF F-SIGNAL | 12 |
| 4E | Ip CONTROL CONTINUOUS VALUE OF B-SIGNAL | 12 |
| 50 | Ip CONTROL SAMPLING TIMES | 12 |
| 52 | Ip CONTROL VALUE OF ACCUMULATIVE F-SIGNALS | 12 |
| 54 | Ip CONTROL VALUE OF ACCUMULATIVE B-SIGNALS | 12 |
| 56 | DECISION MODE IN Ip INCREMENT CONTROL | 2 |
| 58 | DECISION MODE IN Ip DECREMENT CONTROL | 2 |
| 5A | DECISION MODE IN Ip RESET CONTROL | 2 |
| 5C | POSITION OF Ip CHECK PULSE | 16 |

FIG. 12(B)

| ADDRESS | DATA | |
|---|---|---|
| | CONTENTS | BIT |
| B2 | THRESHOLD FOR Ip CONTROL | 8 |
| BE | DETECTION DATA FOR Ip CONTROL | 1 |
| C8 | EVALUATION OF LEVEL IN Ip CONTROL | 1 |

FIG. 12(C)

PULSE GENERATING METHOD AND APPARATUS

BACKGROUND OF INVENTION

Field of the Invention

This invention generally relates to an apparatus and method of generating electrical pulses and, more particularly, to an apparatus and method of generating electrical machining pulses in the power supply of an electric discharge machining (EDM) system.

Description of Prior Art

In conventional power supply units for EDM systems pulses of electrical power are supplied to a workpiece; the pulses having preset on-times and off-times. The power supply unit then supplies a train of pulses based upon the pre-set on-time and the pre-set off-time.

An example of the conventional power supply unit is shown in FIG. 10(A). The unit includes pulse generator 100 having a counter 101 for counting ON time clock pulses applied to its input. The output of the counter 101 goes to a comparator 102 which compares the count from counter 101 to a number stored for ON time data comparator 102. The ON time data specifies the time during which the pulses are at a high level, or "on." When the count from the counter 101 equals the number stored for ON time data, the comparator 102 sends a signal to reset a RS flip-flop 105.

The pulse generator 100 also includes a counter 103 for counting the number of OFF time clock pulses applied to its input. A comparator 104 receives the count from counter 103 and compares it to a number stored for OFF time data, which specifies the time period between pulses. When the count from the counter 102 equals the number stored for OFF time data, the comparator 104 sets the RS flip-flop 105.

The output of the RS flip-flop also resets the counters 101 and 103. The output of the RS flip-flop 105 is connected to the enable input of the counter 101 and to the enable input of counter 103 through an inverter 106. Thus, when the output of RS flip-flop goes high, the on-time counter is enabled to count on-time clock pulses and when the output of the RS flip-flop 105 goes low, the off-time counter is enabled to count off-time clock pulses.

By the setting and resetting of the RS flip-flop 105, a plurality of pulses are generated at its output. While the level of each pulse is high, the counter 101 counts the ON time clock pulses until the count reaches the count stored for the ON time data, at which time counter 101 stops counting and resets the RS flip-flop 105. Counter 103 is then enabled to count the OFF time clock pulses. Counter 103 counts up to the number stored for the OFF time data, at which time counter 103 stops counting and RS flip-flop 105 becomes set. Counter 101 is then enabled and the process repeats itself.

FIG. 10(B) illustrates the use of the pulse generator in an electric discharge machining apparatus. As shown in the figure, a divider 111 supplies the counter 101 with ON time clock pulses and a divider 112 supplies the counter 103 with OFF time clock pulses. A CPU supplies comparator 102 and comparator 104 with ON time data and OFF time data, respectively. The dividers 111 and 112 divide the clock pulses according to data, for example a voltage signal, detected at a gap G formed between an electrode E and a workpiece W.

FIG. 10(C) illustrates a conventional pulse generator 300 in which only the off-time is controlled. The pulse generator 300 has a ROM 301 located between the CPU and the comparator 102 and a ROM 302 located between the CPU and the comparator 104. The ROMs 301 and 302 supply ON time data and the OFF time data to the comparators 102 and 104, respectively, based upon the initial values stored in memory. A divider 303 receives a clock signal and supplies an output divided according to detected data from the gap G to the off-time counter 103.

In conventional pulse generators of the type illustrated in FIGS. 10(A) to 10(C), however, the data to be selected for evaluation and analysis is implemented in a dedicated circuit. The manner in which this data is to evaluated and analyzed for the control of ON time data and OFF time data is also implemented in a dedicated circuit. Thus, in the prior art circuits it is difficult to modify the data selected or the manner in which the data is evaluated.

Additionally, different types of electric machining methods require different hardware configurations. Since the amount of hardware which can be accommodated on a single integrated circuit (IC) is limited, it is difficult to provide an IC which is compatible with numerous electric machining methods. It is also difficult to provide a hardware configuration which is common to numerous electric machining methods.

Further, depending upon the type of cut desired, such as a rough cut or a finishing cut, it is desirable to have different criteria for determining whether a condition, such as the voltage across the gap, is acceptable. Conventionally, however, the hardware was designed to be usable for both types of cuts. As a result, the data selectable for the ON time and OFF time was the same for different machining methods.

Another problem in the prior art is that although the voltage for the machining of copper-titanium electrode pairs is typically 10 to 15 volts, the voltage for the machining of copper-steel electrode pairs is typically 20 to 25 volts. Thus, if the pulse control method for machining copper-titanium electrode pairs was applied to copper-steel electrode pairs, the normal machining of the copper-steel electrode pairs would be read as an abnormal discharge. The pulse would then be controlled so that the OFF time is shortened to a value smaller than that necessary. In short, in order to determine whether poor conditions exist at the gap, the criteria should depend, at least in part, on the materials of the workpiece and the electrode.

Additionally the time $\tau_w$ (waiting time) during which no discharge occurs even though voltage is applied to across the gap, varies according to whether a fluid is flushed through a hole where the cutting occurs or if the machining is performed in a submerged tank. When cutting occurs a submerged tank, a shorter $\tau_w$ will result in abnormal discharges with the chips remaining fixed to the workpiece. The deionization of the fluid is then prevented during subsequent discharges. On the other hand, when the machining is performed with the gap being flushed by a fluid, a shorter $\tau_w$ will not present a problem. Therefore, if the on-time and off-time of the pulses are controlled by the detection of $\tau_w$, abnormal discharges, when using submerged machining, may be properly controlled while when machining with gap fluid flushing, the machining may be unnecessarily slowed down due to excessive pulse control.

The above-mentioned problems associated with the control of the on-time and off-time are also associated with the control of the peak current of the pulse.

SUMMARY OF THE INVENTION

It is an object of the present invention to provide a pulse generator for EDM systems in which the on-time, off-time, and the peak current of the pulses are easily changed.

It is another object of the present invention to provide a pulse generator which has hardware that can be used regardless of the specific machining method being used. Thus, it is an object to provide hardware that is capable of being used for diesinking EDM, wire-cut EDM, electrolytic machining (ECM), as well as others.

It is a further object of the present invention to provide a pulse generator in which a discharge can be classified as abnormal or normal accurately in changing machining methods, for instance with changing electrode and workpiece materials.

It is yet a further object of the present invention to provide a pulse generator which can optimally evaluate the progress of machining.

It is yet a further object of the present invention to provide a pulse generator in which the data detected is selectable so that optimal machining may result.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the method of generating pulses of this invention may comprise setting machining parameters, providing the program data on the basis of the parameters, diagnosing the state of machining based upon the program data, controlling the on-time data and off-time data based upon the diagnosis, and generating pulses based upon the program data, on-time data and off-time data. Preferably, the peak current data is also controlled based upon the diagnosis and the pulse is also generated based upon the peak current data.

BRIEF DESCRIPTION OF THE DRAWINGS

The accompanying drawings, which are incorporated in, and form a part of the specification, illustrate embodiments of the present invention and, together with the description, serve to explain the principles of the invention. In the drawings:

FIG. 6 is a timing diagram illustrating the operation of the method of FIG. 5;

FIG. 7 is a timing diagram for the ON time decision circuit 50;

FIG. 8 is a timing diagram for the ON time calculation circuit 30;

FIGS. 9(A) and (B) illustrate exemplary setting for different electrode and workpiece materials;

FIGS. 12(A) to (C) illustrate exemplary peak current program data for the pulse generator of FIG. 11;

DETAILED DESCRIPTION OF THE PREFERRED EMBODIMENT

Reference will now be made in detail to the preferred embodiment of the invention, an example of which is illustrated in the accompanying drawings.

Figure 1:
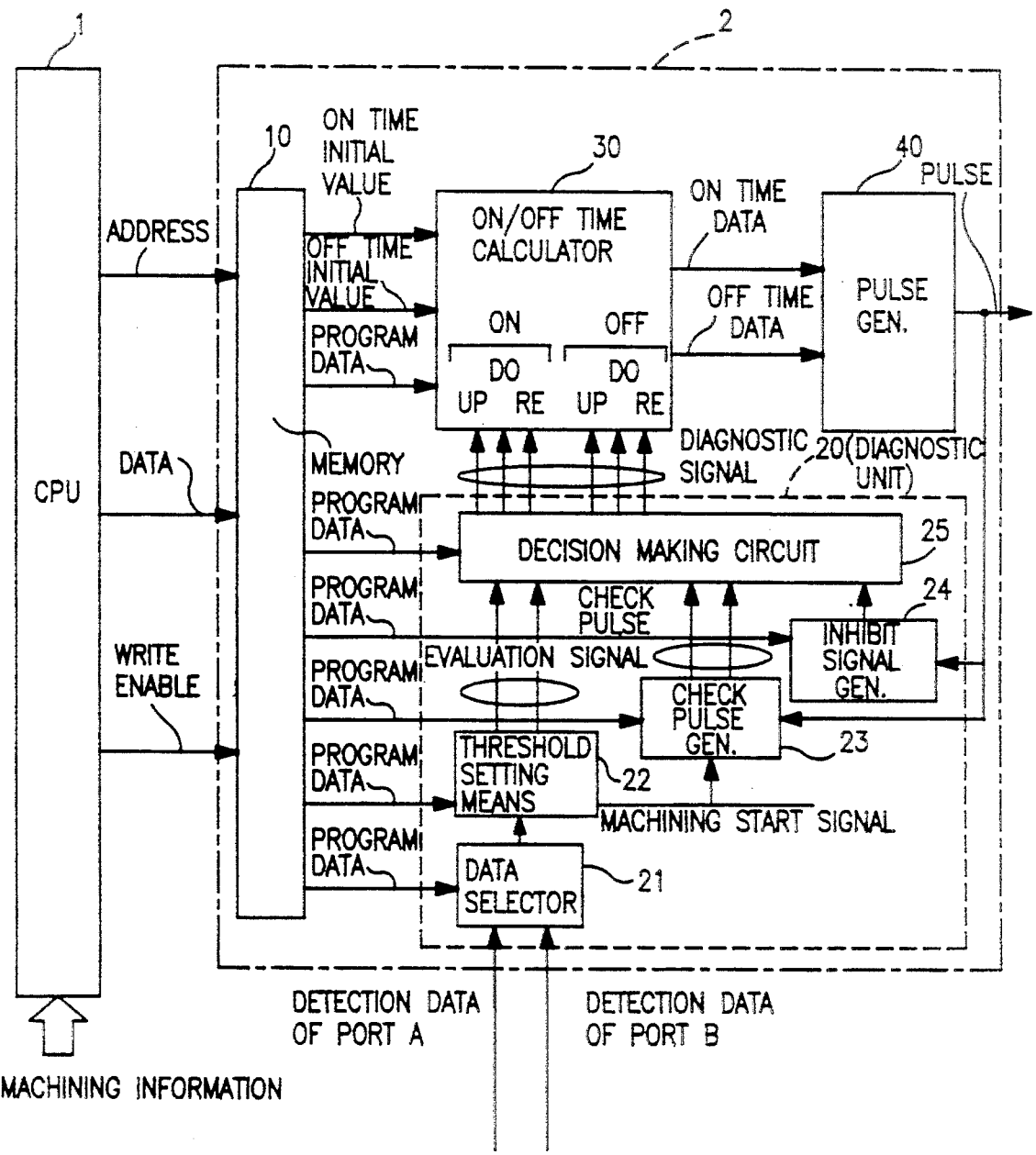
FIG. 1 is a block diagram of one embodiment of the invention.

As illustrated in FIG. 1, a pulse generator 2 according to the present invention includes a memory device 10 which stores information from an external device and a diagnostic unit 20 which diagnoses the machining state. The diagnostic unit 20 evaluates data detected at the gap and generates a diagnostic signal based upon the detected data. An ON/OFF time calculator 30 modifies an ON time data and OFF time data based upon the diagnostic signal and a pulse generator 40 generates machining pulses based upon the ON time data and OFF time data.

The pulse generator 2 receives signals, for example, data, address, and write enable signals, from a CPU 1. Preferably, for example only, the CPU 1 may be an INTEL 87C19KB microprocessor. The memory 10 may comprise a plurality of registers which store initial on-time, off-time, and program data from the CPU 1. Data is written into the memory 10 when the memory 10 receives the write enable signal from the CPU 1. The pulse generator 2 also receives data detected by sensors at the gap.

The CPU 1 receives machining information, for example from an operator, for transferring the appropriate data into the memory 10. The machining information includes, for example, the electric machining method used, the workpiece material, the electrode material, the characteristic of the machining fluid, the type of fluid flushing used, and operator requests such as, for example, surface roughness, removal rate, and electrode wear rate. The operator may input the desired machining information at the start of machining and may update or alter the information after machining has commenced. The operator may also program the CPU 1 so that the machining information changes as the machining progresses to a certain point.

The diagnostic unit 20 may further comprise a detection data selector 21, a threshold setting means 22, a check pulse generator 23, an inhibit signal generator 24, and a decision making circuit 25. The detection data selector 21 receives data from one of the multiple registers in memory 10 for the determination of the gap information which will be used for subsequent analysis. The threshold setting means 22 generates signals which indicate whether the data selected by the detection data selector 21 are above, for example, a threshold level. The threshold setting means 22 establishes the threshold level according to data stored in the memory 10.

The check pulse generator 23 controls the timing of check pulses from a given point in time. For example, an ON time check pulse and an OFF time check pulse may be generated at certain times after the rising edge of the gate signal. The ON time check pulse and the OFF time check pulse indicate the times when an evaluation signal should be read.

The inhibit signal generator 24 generates an inhibit signal which inhibits the reading of the evaluation signal until a predetermined time after the rising edge of the gate signal.

The decision circuit 25 independently generates diagnostic signals for the ON time control and the OFF time control. The diagnostic signals are based on the evaluation signal, check pulse signal, and inhibit signal.

In the embodiment of FIG. 1, the CPU 1 changes the data stored in memory 10 according to the machining needs. Thus, the data selected by the detection data selector 21, the threshold level set by the threshold setting means 22, the duration of the inhibit signal generated by the inhibit signal generator 24, the timing of the check pulses generated by the check pulse generator 23, the diagnostic signal generated by the decision circuit 25, the ON time data and the OFF time data provided by the ON/OFF time calculator 30 are all programmable.

Figure 2:
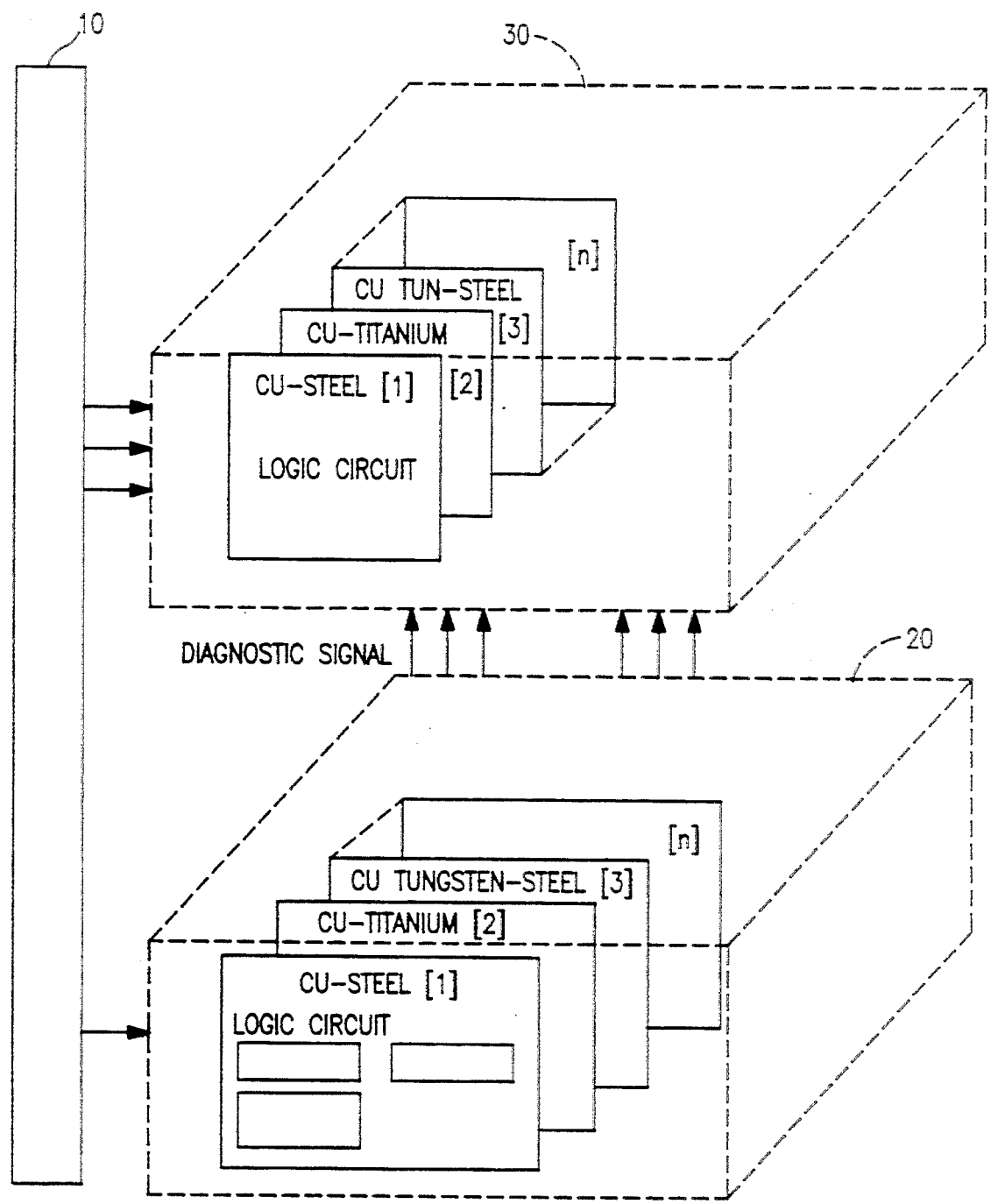
FIG. 2 is an embodiment of the diagnostic unit and calculator for the pulse generator of FIG. 1.

FIG. 2 illustrates an embodiment of the ON/OFF time calculator 30 and the diagnostic unit 20 of FIG. 1. As shown in FIG. 2, the diagnostic unit 20 is provided with a plurality of different logic circuits, for example, logic circuits for diagnosing copper-steel machining, copper-titanium machining, copper-tungsten-steel machining, and so forth. The specific logic circuit is selected according to the data programmed in memory 10.

The ON/OFF time calculator 30 also includes a plurality of logic circuits for generating the ON time data and OFF time data according to a selected logic circuit. As before, these logic circuits include, for example, different logic for copper-steel machining, copper-titanium machining, copper-tungsten-steel machining, and so forth. The logic circuit for the ON/OFF time calculator 30 is also selected according to data programmed into the memory 10.

Accordingly, even though the pulse generator 2 has a single configuration for multiple machining methods, because the diagnostic unit 20 and the ON/OFF time calculator 30 contain a plurality of logic circuits for different machining situations, the pulse generator 2 can be programmed to select the optimum pulse width according to the machining situation encountered. The pulse generator 2 can therefore be used with more than one machining situation without sacrificing in performance.

Figures 3A, 3B:
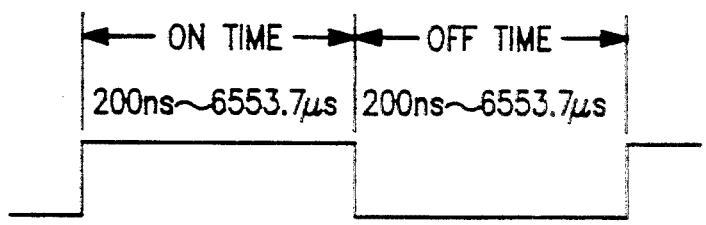
FIGS. 3 (A) to (D) is an embodiment of the program for the pulse generator of FIG. 1.

FIG. 3(A) illustrates an example of a memory map for the data transferred to the ON/OFF time calculator 30 through memory 10. In FIG. 3(A), all addresses are expressed in hexadecimal digits and the numbers under the "Bit" column indicate the number of bits for the corresponding programmable variable. For instance, at an address of 00, a 16 bit initial value of ON time is stored and at an address of 02, a 16 bit initial value of OFF time is stored. Other variables may, for example, include values for the increment of ON time, decrement of ON time, upper and lower limits for ON time, increment of OFF time, decrement of OFF time, and the upper and lower limits of OFF time. Also, the data stored for the use of ON time control and the data for use of OFF time control respectively control whether the ON time control and OFF time control are enabled. As shown in FIG. 3(A), for example, a value of "0" stored in the use of ON time control will enable the control while a value of "1" will disable the control.

FIG. 3(B) illustrates an example of a pulse waveform generated by the pulse generator 40 with the ON time and OFF times labeled. Preferably, for example, the ON time and OFF time may be selected in 100 ns increments from a range of 200 ns to 6553.7 μs. A different time range and a different increment may be used by, for example, modifying the frequency of the clock applied to the pulse generator 2.

FIGS. 3(C) and 3(D) illustrate examples of memory maps for the data that is transferred to the diagnostic unit 20 through memory 10. The contents of the data may, for example, include program data for setting the ON time control mode. The ON time control is operable is a decrement/reset control mode in which the ON time can be decreased a specific amount or can be reset to the initial value of ON time, an increment/reset control mode in which the ON time can be increased a specific amount or reset to the initial value, and in an increment/decrement/reset mode which is a combination of all three modes. These modes are respectively represented by values stored in address 10 of "00", "01", and "10".

The exemplary data stored in addresses 1C, 1E, and 20 is used for the setting of the decision mode by which the incrementing, decrementing, and resetting of the ON time is controlled. The four exemplary decision modes are an F-signal continuous value mode, an F-signal accumulated value mode, a B-signal continuous value mode, and a B-signal accumulated value mode. These modes are respectively selected by values of "00", "01", "10", and "11."

An F-signal is generated within the decision circuit 25, for example, when the data detected is above the threshold level. The F-signal represents that the detected data is acceptable. A B-signal is generated when the data detected is below the threshold level, and thus unacceptable. The F-signals and B-signals are generated according to the evaluation signal from the threshold settor 22, the check pulse from check pulse generator 23, and the inhibit signal from the inhibit signal generator 24. Also, although "acceptable" has been used above to mean a threshold level, "acceptable" may instead symbolize below a threshold, within a range, etc. Similarly, the B-signal, symbolizing "unacceptable" may be generated when the detected data is above a threshold, outside of a range, etc.

The F-signal continuous value mode, with regard to the increment of ON time, for example, will cause the ON time to be incremented when the continuous value of the F-signals reaches a specified amount, stored in memory 10 as the continuous value of the F-signal. Also, the B-signal continuous value mode will cause the ON time to increase when the continuous value of the B-signals reaches a specified amount, stored in memory 10 as the continuous value of the B-signal.

The F-signal accumulated value mode will increase the ON time when a certain number of F-signals, designated in memory 10 as the value of accumulated F-signal, occur during a certain number of sampling times, also designated in memory 10. The B-signal accumulated value mode will increase the ON time when a certain number of B-signals, designated in memory 10 as the value of accumulated B-signals, occur during the designated number of sampling times.

The memory map also has data for the selection of the modes for the ON time decrement control, ON time reset control, OFF time increment control, OFF time decrement control, and OFF time reset control, which are all operable in the F-signal continuous value mode, F-signal accumulated value mode, B-signal continuous value mode, and B-signal accumulated value mode. The selection and operation of these modes is similar to the selection and operation of the modes associated with incrementing the ON time.

The exemplary program data of FIG. 3(C) also stores a value for the positioning of the check pulse. The check pulse represents a generated time interval, specified as the check pulse position, after the rising edge of the gate signal. The check pulses specify the times at which the evaluation signals are to be taken.

The exemplary memory map of FIG. 3(D) illustrates the program data used for the setting of the threshold level for ON time control and the threshold level for OFF time control. The data is also used for selecting the detection data for ON time control and the detection data for OFF time control. For instance, a "0" for the detection data of ON time control indicates that detected data is to be selected from a port A for the control of ON time and a "1" indicates that the detected data is to be selected from a port B. The detection data for OFF time control is similarly set.

The exemplary program data of FIG. 3(D) also has data for the evaluation of the detection data, for example, when the data is larger than the threshold, for use with the ON time control, and data for the evaluation of the detection data for use with the OFF time control. For example, a "0" may indicate that values below the threshold are unacceptable or a "1" may indicate that values above the threshold are unacceptable.

The program data also has a bit at 64 for determining whether ON clamp is used. When the ON clamp is used, a check pulse is generated after a given time period from the falling edge of a machining start signal, rather than the rising edge of the gate signal. The machining start signal indicates the start of electric machining by, for example, detecting the voltage drop across the gap.

The exemplary data of FIG. 3(D) also has a bit at 74 for determining whether an inhibit signal is used. A 10 bit piece of data at A2 determines the duration of the inhibit signal.

Figure 4A:
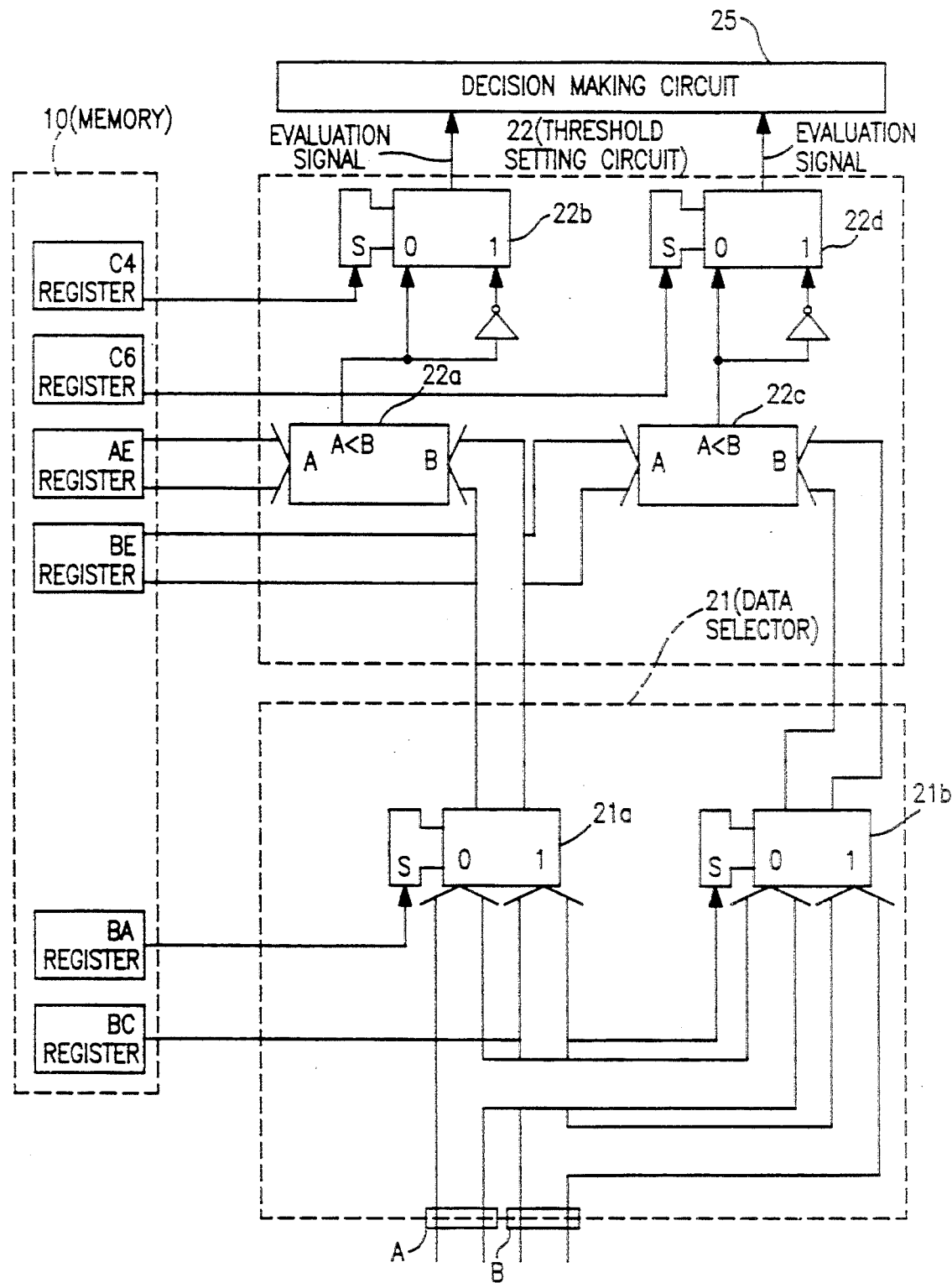
FIGS. 4(A) to (J) are schematic diagrams illustrating of the embodiments of aspects of the elements in the pulse generator of FIG. 1.

As shown in FIG. 4(A), the detection data selector 21 preferably includes selectors 21a and 21b which select data from either port A or from port B. The selection of the ports is made according to the registers BA and BC in memory 10. Ports A and B are input ports to the detection selector 21 and receive detected data that is indicative of the machining state. The detected data at port A, for example, may be a signal representing the gap voltage and the detected data at port B may be a signal representing the gap current. The signals received at ports A and B are, preferably, the digital equivalents of the signals detected at the gap. The voltage signal at port A, for instance, may have a minimum value of 1 volt and may be selected for either the ON time control or the OFF time control. The selector 21a is used for the ON time control and selector 21b is used for the OFF time control. As a result of the design, the data for the ON time control may be independently selected from the data for the OFF time control.

Within the threshold setting means 22, a pair of comparators 22a and 22c receive the detected data, for example the gap voltage, from selectors 21a and 21b, respectively. The comparators 22a and 22c compare the received data to threshold levels set by data stored within registers AE and BE, respectively. A high level of "1" is generated by the comparators 22a and 22c when the data detected are greater than the threshold levels.

A pair of selectors 22b and 22d receive the outputs from the comparators 22a and 22c, respectively. The value of the data stored in registers C4 and C6 control the selectors 22b and 22d, respectively, according to whether a signal above the threshold represents an acceptable or unacceptable condition. According to this data and the signal received from the comparators 22a and 22c, the selectors 22b and 22d generate evaluation signals which indicate whether the data detected represents an acceptable or unacceptable condition. The comparator 22a and selector 22b are used for ON time control and the comparator 22c and selector 22d are used for OFF time control. In accordance with the invention, the threshold levels and evaluation modes may be independently programmed for ON time control and for the OFF time control.

Although only two ports A and B have been used in this exemplary embodiment, as will be apparent to the artisan, other numbers of ports are possible. Additional ports may provide data representative of the temperature of machining fluid, the machining frequency in electric machining, the high frequency component in the electric discharge, and brightness, color tone, and sound of the electric discharge. Also, data from more than one port may be selected simultaneously with the result that more than one evaluation signal would be generated. These modifications may be accomplished by adding the desired number of threshold setting means 22 and address registers.

Figure 4B:
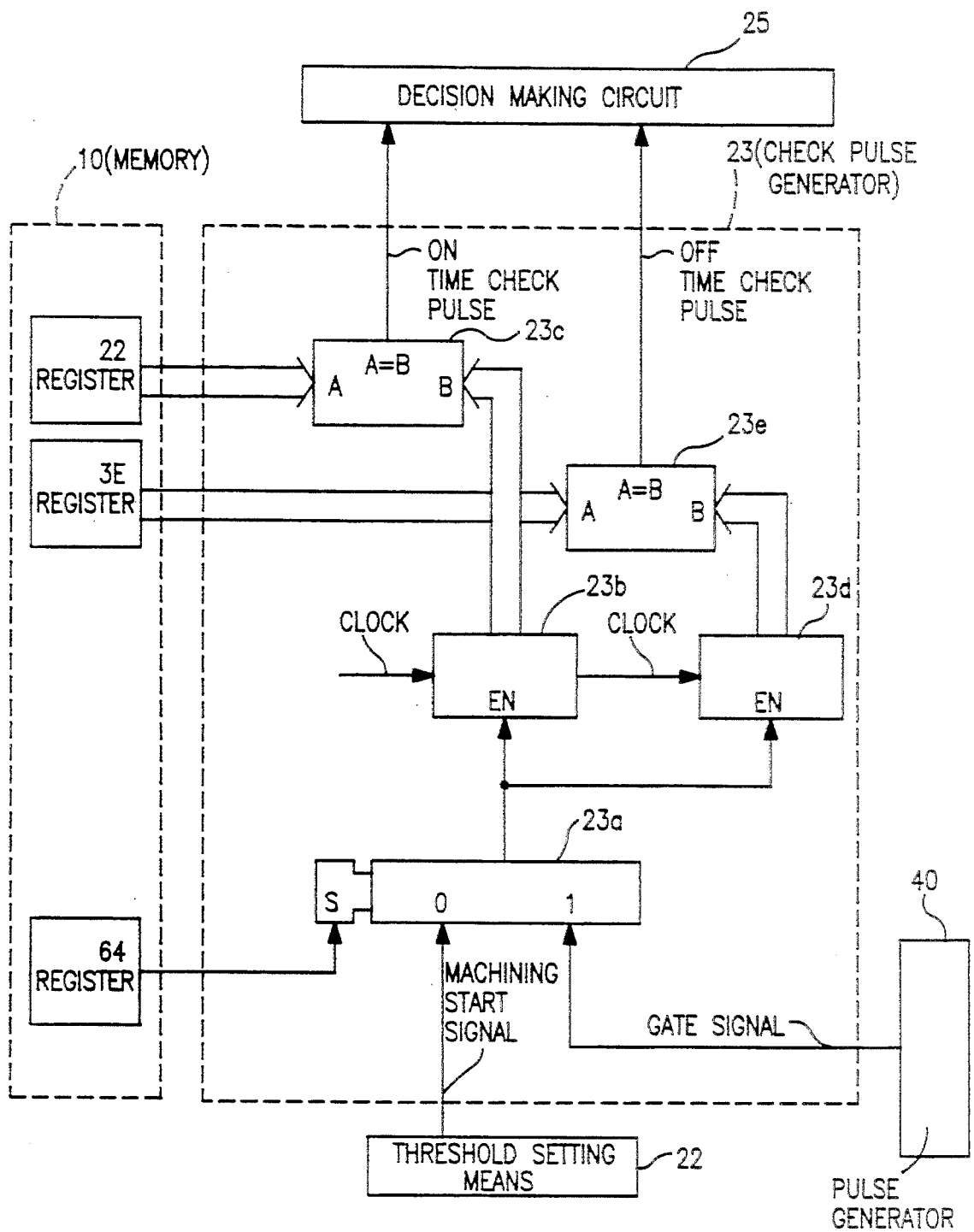

As best shown in FIG. 4(B), the check pulse generator 23 receives the gate signal generated by the pulse generator 40 and the machining start signal, which is the signal generated by the threshold setting means 22. A selector 23a selects the machining start signal when the ON clamp bit is 0 and selects the gate signal when the ON clamp bit is 1. The output of the selector 23a is provided to counters 23b and 23d, which start counting clock pulses at their inputs when an output from selector 23a is received. The counts from counters 23b and 23d are input to comparators 23c and 23e, respectively. Comparator 23c generates a check pulse for ON time control when the count received from counter 23b equals the value of the position of the ON time check pulse, which is stored in register 22 of memory 10. Likewise, comparator 23e generates a check pulse for OFF time control when the count from counter 23d equals the value of the position of the OFF time check pulse, which is stored in register 3E of memory 10. Thus, with a single hardware configuration, the check pulse for ON time control and the check pulse for OFF time control may be independently generated and separately programmed.

Figure 4C:
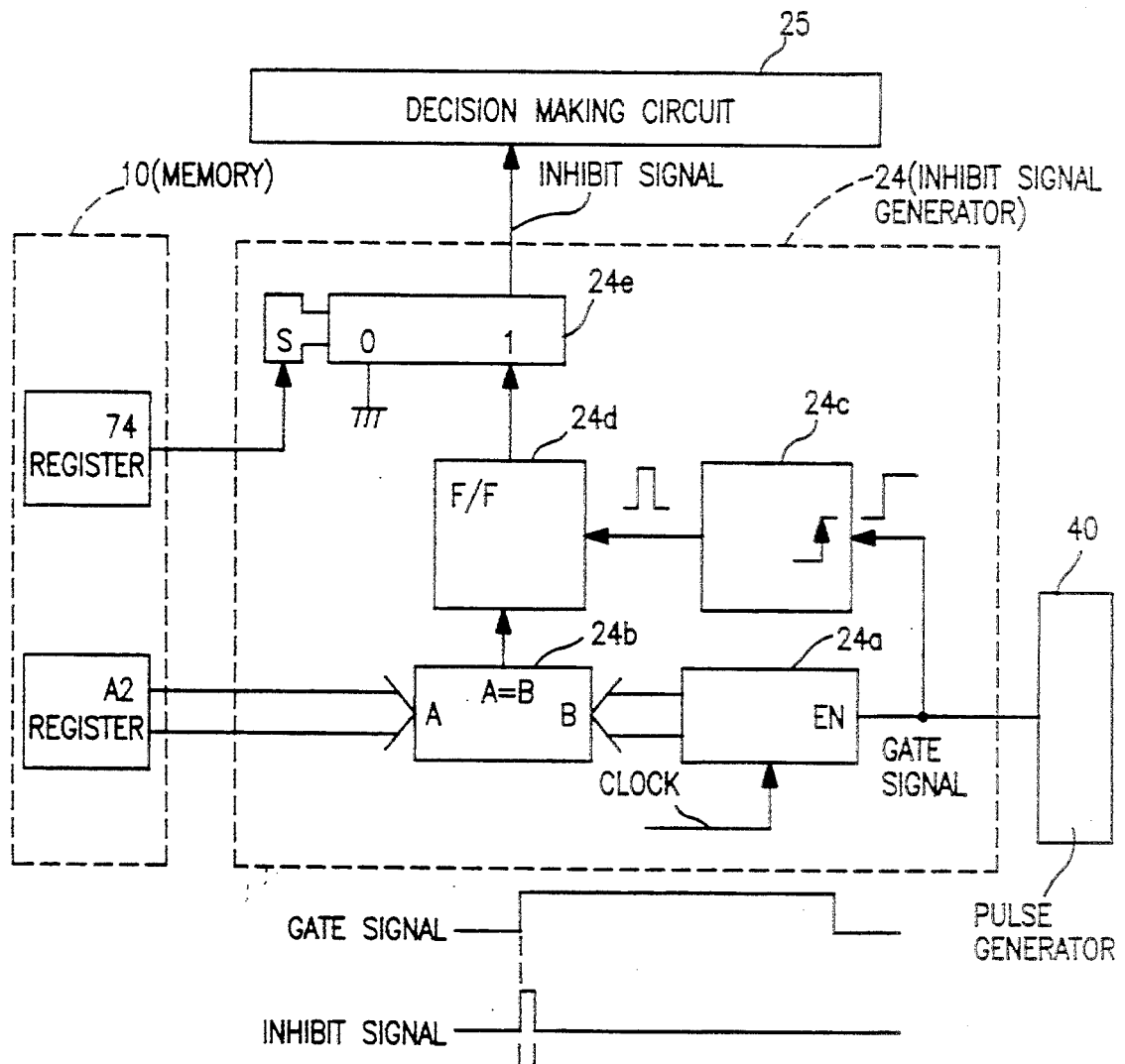

An exemplary embodiment of the inhibit generator, as shown in FIG. 4(C), comprises a counter 24a, a comparator 24b, a differentiating circuit with a one-shot multivibrator 24c, an RS flip-flop 24d, and a selector 24e. When the gate signal rises to its high level, the differentiating circuit with a one-shot multivibrator 24c provides a pulse to the RS flip-flop 24d. The RS flip-flop 24d is then set to generate a high output. If the output of the inhibit signal is enabled by register 74, the output of the RS flip-flop 24d is provided to the decision circuit 25 as an inhibit signal. Also with a rising edge of the gate signal, the counter 24a begins to count clock pulses at its input. The comparator 24b generates an output when the count from counter 24a equals the value stored in register A2, representing the duration of the inhibit signal. The signal from comparator 24b then resets the RS flip-flop 24d to cause its output to go to its low level.

The inhibit signal prevents the check pulses from being effective for the time that it takes for the gate signal to rise to its high level. Consequently, the diagnosis of the machining state is more accurate and reliability is increased. Also, since the duration of the inhibit signal is programmable, the duration of the inhibit signal is adaptable to different machining methods and to the different times which it takes for the gate signals to rise to their high levels.

Figure 4D:
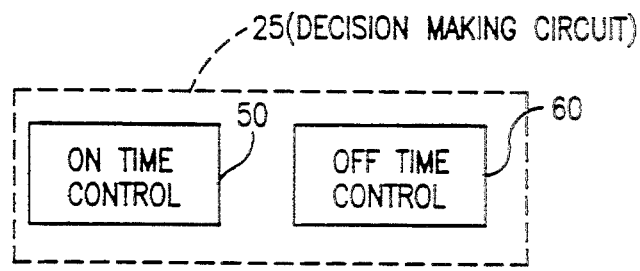

An exemplary embodiment of the decision circuit 25 as shown in FIG. 4(D), comprises a decision circuit for ON time control 50 and a decision circuit for OFF time control 60. An exemplary decision circuit for ON time control 50, is illustrated in more detail in FIG. 4(E). In the embodiment illustrated in FIG. 4(E), the decision circuit comprises an F/B signal generator 51 which generates the F-signals and B-signals; an accumulated value signal generator 52 which generates an F-signal accumulated value and B-signal accumulated value; an F/B continuous value signal generator 53 which generates an F-signal continuous value and B-signal continuous value; a selection circuit 54; an UP/DO/RE signal generator 55 for generating an up increment UP, down decrement DO, and reset signal RE signal as the diagnostic signals.

In the illustrated embodiment, the F/B signal generator 51 comprises an OR gate 51a, AND gates 51b and 51c, and inverters 51d and 51e. The generation of the F-signals and B-signals are dependent upon the evaluation signals from the threshold setting means 22, on the check pulses received from the check pulse generator 23, and upon the inhibit signal from the inhibit signal generator 24. An F-signal of "1" will be generated when the F/B signal generator 51 receives an evaluation signal of "1" when a check pulse is received. Likewise, a B-signal of "1" will be generated if an evaluation signal of "1" is received along with a check pulse An inhibit signal of 37 1" however, will prevent the generation of either an F-signal or a B-signal.

In the illustrated embodiment, the accumulated value signal generator 52 generates the F-signal and B-signal accumulated values based upon the F-signals and B-signals received from the F/B signal generator 51, upon the stored values for the accumulated F-signals and accumulated B-signals, and upon the stored data for sampling times. The F-signal accumulated value signal will be generated when the number of occurrences of F-signals equals the value stored for the accumulated F-signal within the stored number of sampling times. The B-signal accumulated value signal will be similarly generated.

The accumulated value signal generator 52 comprises a counter 52a which counts the occurrences of F-signals and supplies a comparator 52b with the count. When the number of F-signals equals the value stored in memory for accumulated F-signals, the comparator 52b generates an accumulated F-signal having a value of "1." A counter 52g counts the occurrences of the B-signals and supplies the count to a comparator 52h, which generates an accumulated B-signal having a value of "1" when the count equals the value of accumulated B-signals stored in memory 10. Another counter 52d counts the F-signals and B-signals supplied through an OR gate 52c. When the count equals the number of sampling times, the comparator 52e generates a signal to reset counters 52a, 52d, 52g. Thus, for example, if the value of the sampling times is set to 10 and the value of accumulated F-signals is set to 4, then an F-signal accumulated value signal will be generated whenever 4 F-signals are received within 10 samples.

Figure 4E:
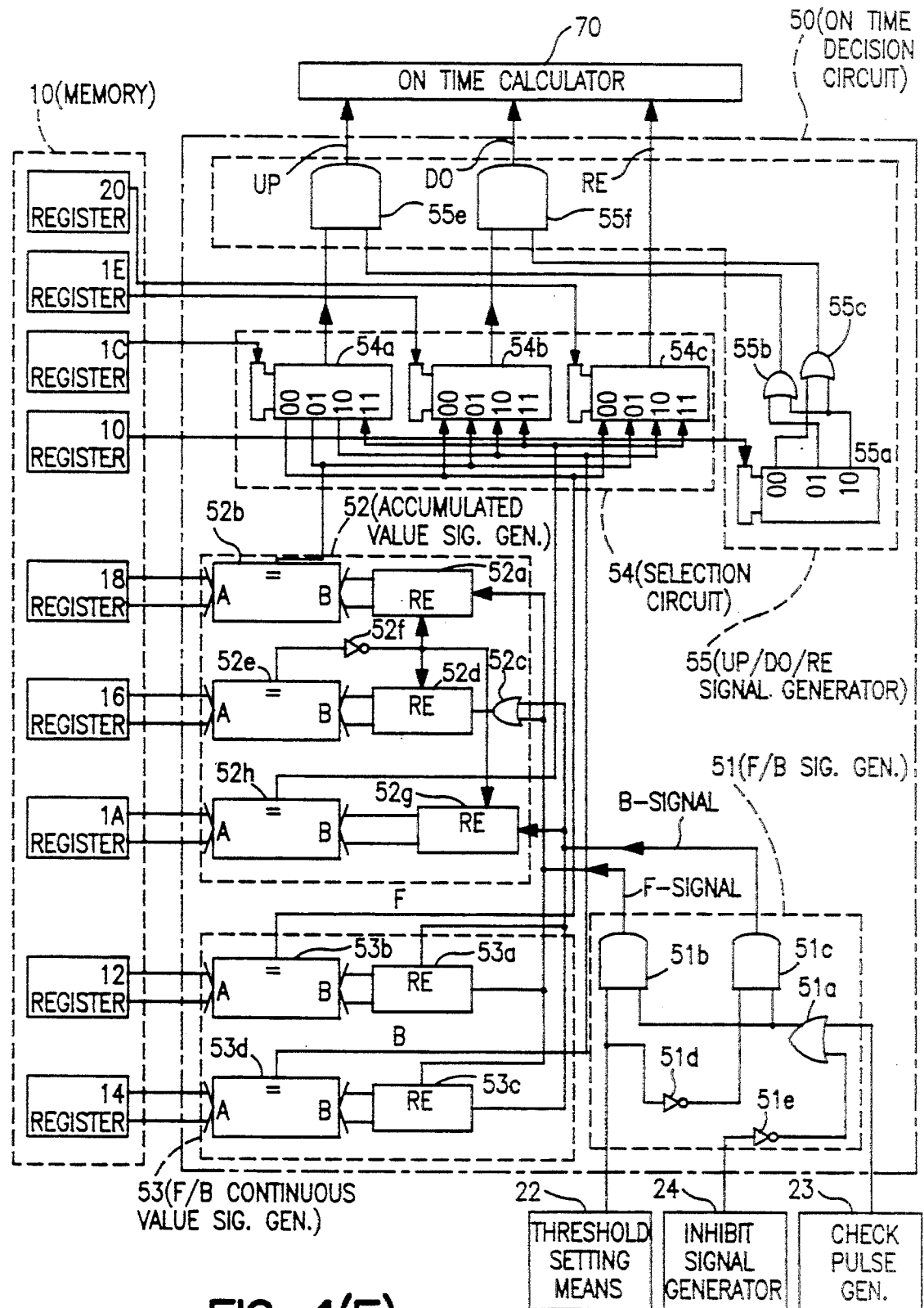

The exemplary continuous value signal generator 53 illustrated in FIG. 4(E) comprises a counter 53a which counts the number of continuous occurrences of the F-signals and is reset whenever a B-signal is received. A counter 53c counts the number of continuous occurrences of B-signals and is reset when an F-signal is received. A comparator 53b generates a continuous value of F-signals when the count from counter 53a equals the value stored in register 12 as the continuous value of F-signals. A comparator 53d generates a continuous value of B-signals when the count from counter 53c equals the value stored in register 14 as the continuous value of B-signals.

The exemplary selection in circuit 54 of FIG. 4(E) comprises selectors 54a, 54b, and 54c. Each of the selectors 54a, 54b, and 54c are programmed into one of four modes by registers 1C, 1E, and 20, respectively, to select either the F-signal continuous value mode, the B-signal continuous value mode, the F-signal accumulated value mode, or the B-signal accumulated value mode.

The exemplary UP/DO/RE signal generator 55 of FIG. 4(E) comprises a selector 55a which is programmed by register 10 to be in either the decrement/reset mode, increment/reset mode, or increment/decrement/reset mode. The signal generator 55 also comprises OR gates 55b and 55c and AND gates 55e and 55f.

Figure 4F:
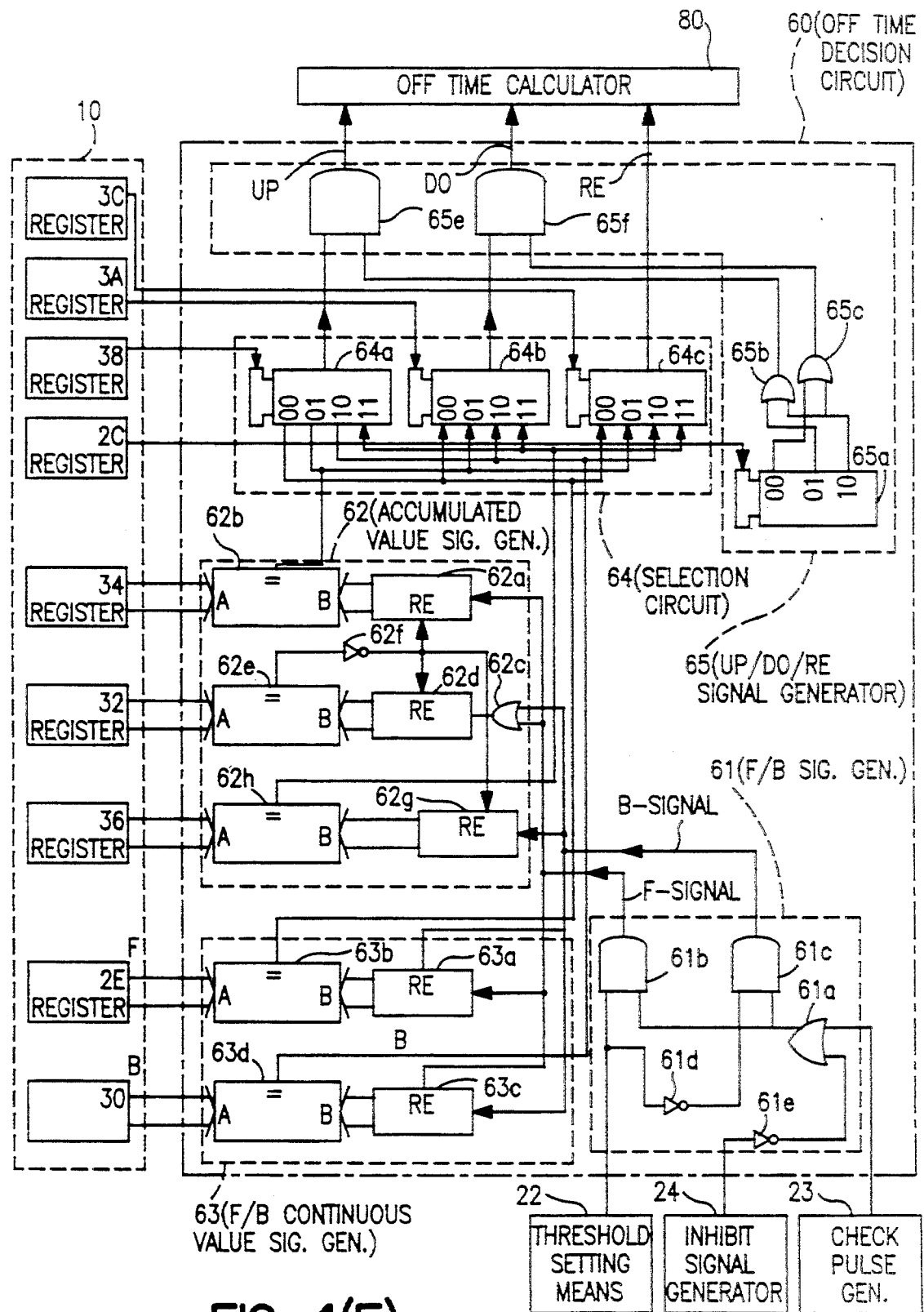

An exemplary decision circuit for OFF time control 60 is shown in FIG. 4(F) and is similar to the design of the decision circuit 50 for ON time control. As a result of the separate decision circuits 50 and 60 the signals for incrementing, decrementing and resetting the ON time and the signals for incrementing, decrementing and resetting the OFF time may be independently controlled and programmed through the use of a single hardware design.

Figure 4G:
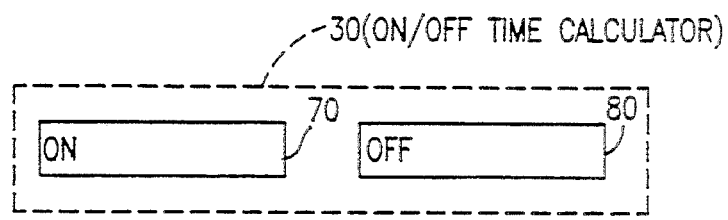
Figure 4H:
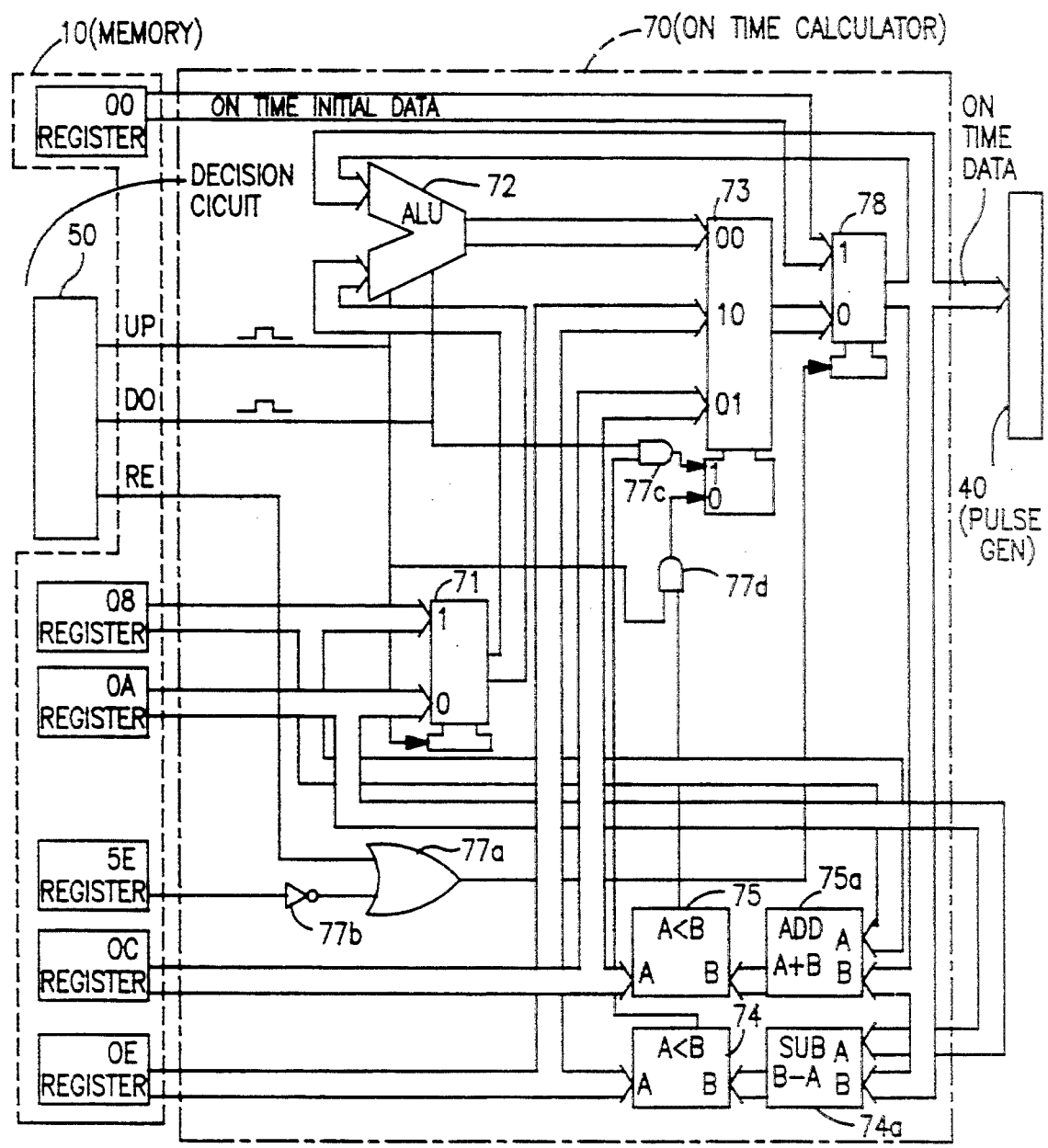
Figure 4:
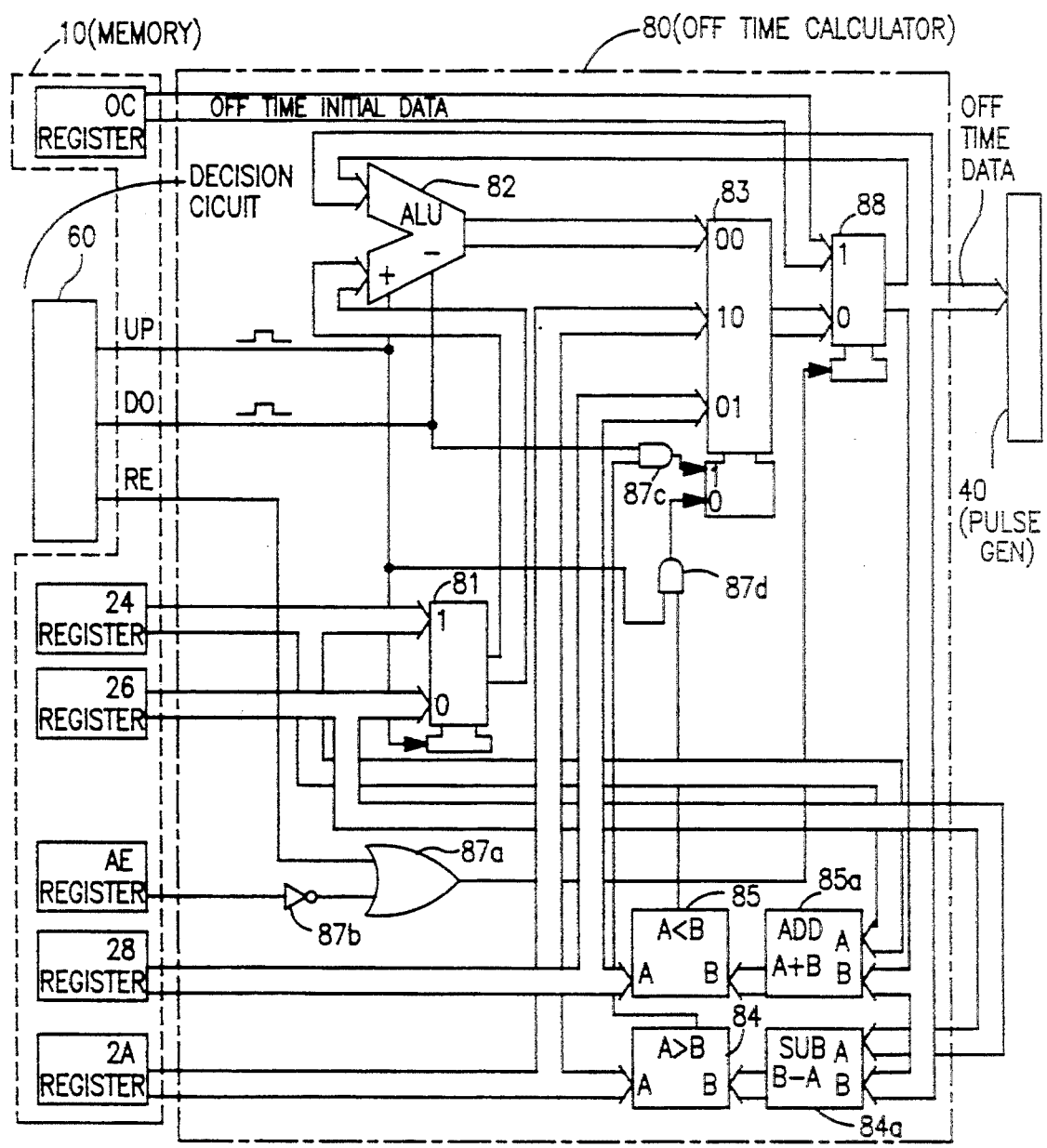

An exemplary ON/OFF time calculator 30 is shown in FIG. 4(G), and comprises an ON time calculator 70 and an OFF time calculator 80. An example of an ON time calculator 70, is shown in more detail in FIG. 4(H). It receives the UP, DO, and RE signals from the decision circuit 50. The UP signal is received at a selector 71 which selects the value for an increment of time when the UP signal has a value of "1" and selects the value for a decrement of time when the value of the UP signal is a "0." The values for the increment and decrement are stored in registers 08 and 0A respectively. An arithmetic logic unit (ALU) 72 receives the value selected from the selector 71 and either adds this value to the ON time when the UP signal has a value of "1" or subtracts this value from the ON time when the DO signal has a value of "1."

A selector 73 receives the output from the ALU, a value of the lower limit of ON time from register OE, and the upper limit of ON time from register OC. The selector 73 provides one of these three inputs to a selector 78.

A subtractor 74a subtracts a value stored for a decrement from the current value of ON time and sends the difference to a comparator 74. The comparator 74 compares the difference to the lower limit for ON time and generates a "1" when the difference is smaller than the lower limit. An AND gate 77c receives the signal from the comparator 74 and the DO signal and causes the selector 73 to select the lower limit of ON time when the subtracted result is less than the lower limit.

An adder 75a adds a value stored for a increment with the current value for ON time and sends the result to a comparator 75. When the added result is larger than the upper limit for ON time, the comparator 75 sends a "1" signal to AND gate 77d. The AND gate 77d also receives the UP signal and causes the selector 73 to select the upper limit of ON time when the added result is larger than the upper limit.

The selector 78 receives the output of the selector 73 and also the initial value of ON time from register 00. An OR gate 77a receives the RE signal and the data from register 5E inverted by inverter 77b. The OR gate 77a causes the selector 78 to select the initial value of ON time when a reset signal RE is received or when the ON time control is enabled. The output of the selector 78 is supplied to the pulse generator 40.

An exemplary OFF time calculator 80 having a similar configuration as that of the ON time calculator 70 is shown in FIG. 4(I). With the separate ON time calculator 70 and OFF time calculator 80, the desired ON time and the desired OFF time may be controlled and programmed separately through the use of a single hardware design.

Figure 4J:
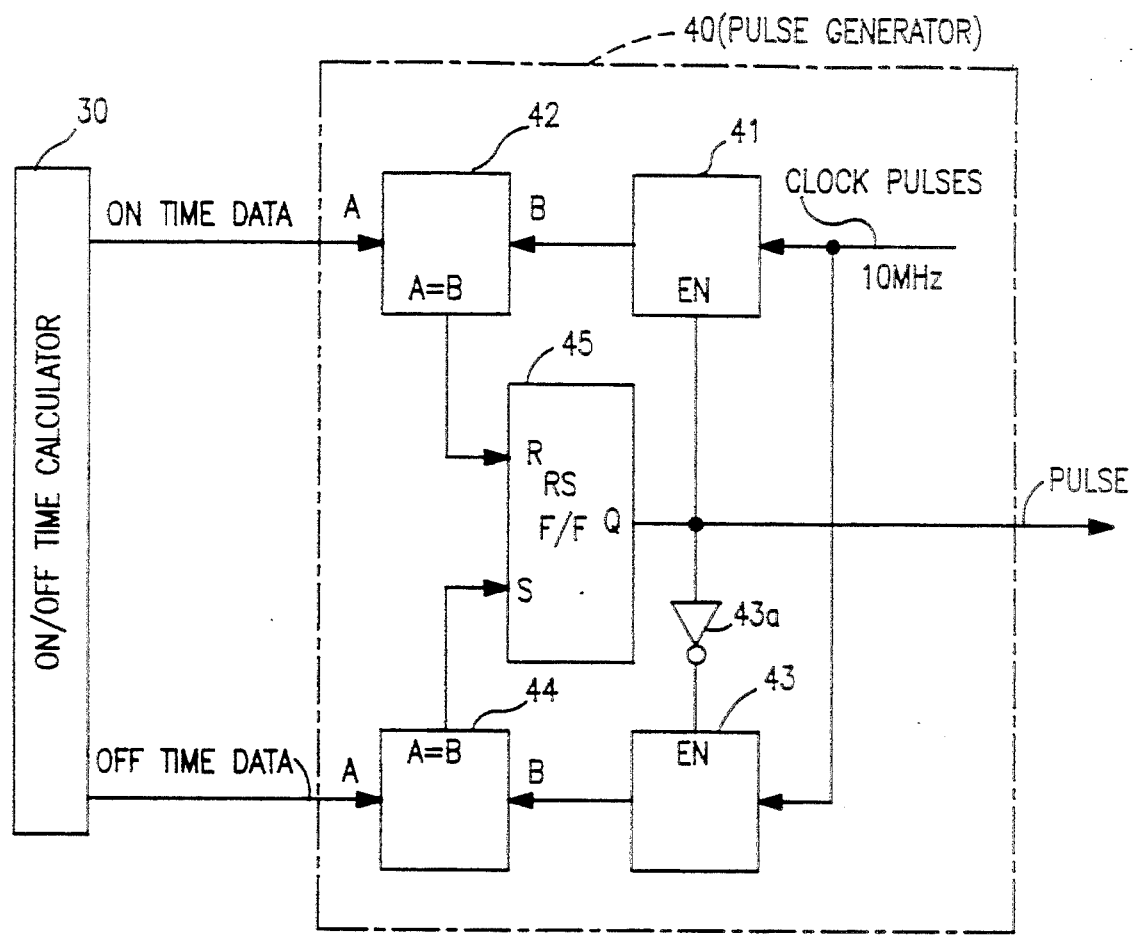

FIG. 4(J) illustrates an exemplary embodiment of the pulse generator 40. The pulse generator 40 comprises a counter 41 which starts counting clock pulses, preferably, for example, from a 10 MHz clock supplied to its input, when an output of an RS flip-flop 45 goes high. A comparator 42 generates a "1" when the count from counter 41 equals the value of ON time supplied from the ON/OFF time calculator 30. A "1" from comparator 42 causes the RS flip-flop 45 to be reset, which results in the output of the RS flip-flop 45 to go to "0".

A "0" output from RS flip-flop 45 is supplied to counter 43 through an inverter and results in counter 43 being reset. Counter 43 then starts to count the clock pulses at its input. A comparator 44 generates a "1" when the count from counter 43 equals the value of OFF time supplied from ON/OFF calculator 30. The output of "1" from comparator 44 sets the RS flip-flop 45, causing its output to go "1". This, in turn, resets counter 41 to start counting the ON time and thus repeats the process.

Figure 5:
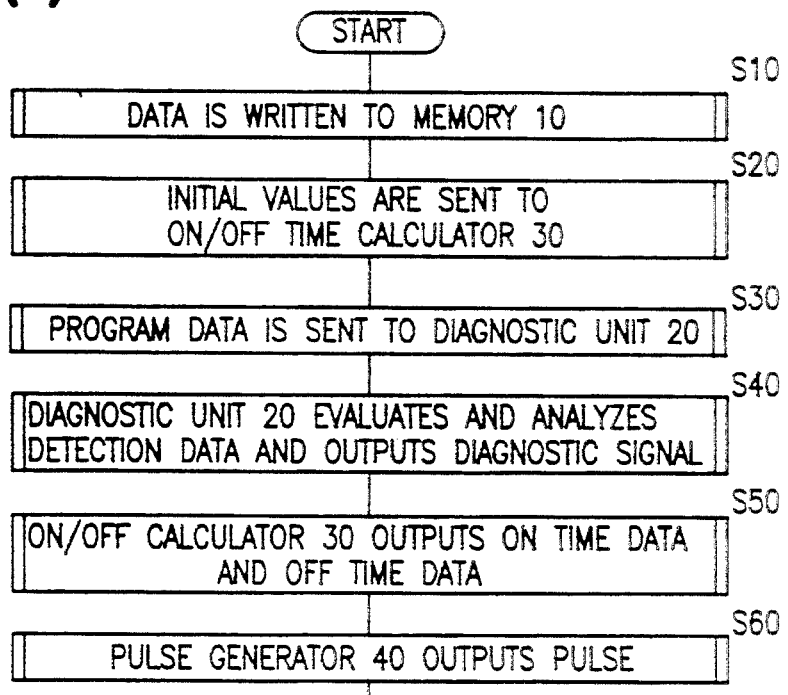
FIG. 5 is a flow chart illustrating a the method of generating pulses.
Figure 10A:
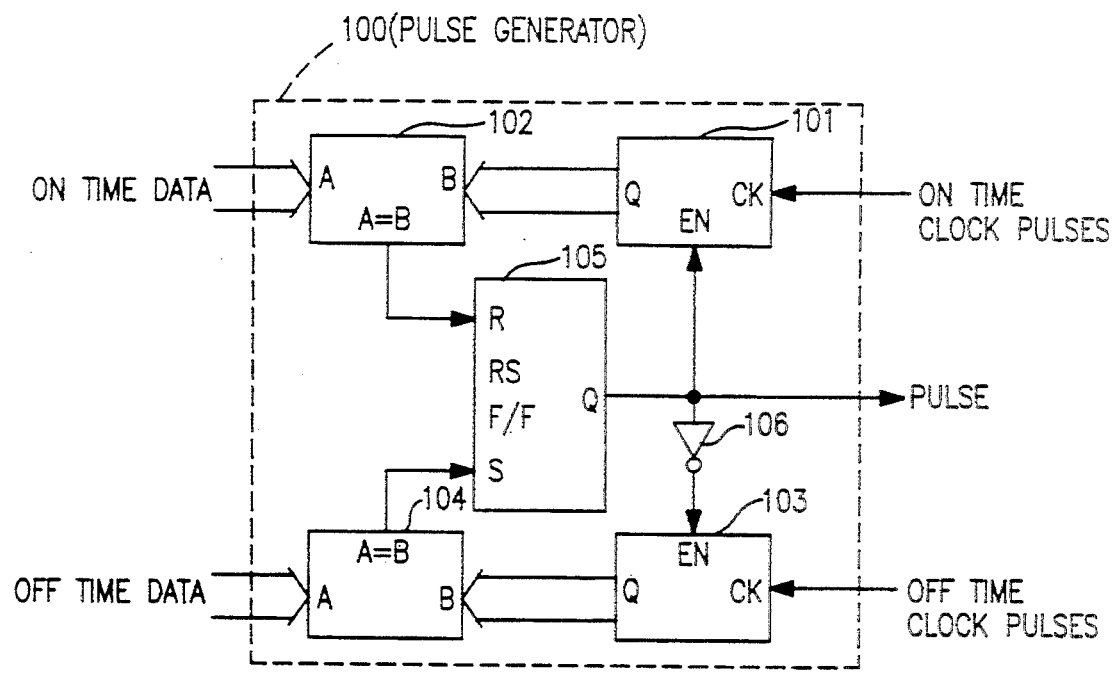
FIGS 10(A) to (C) illustrate a prior art pulse generator.
Figure 10B:
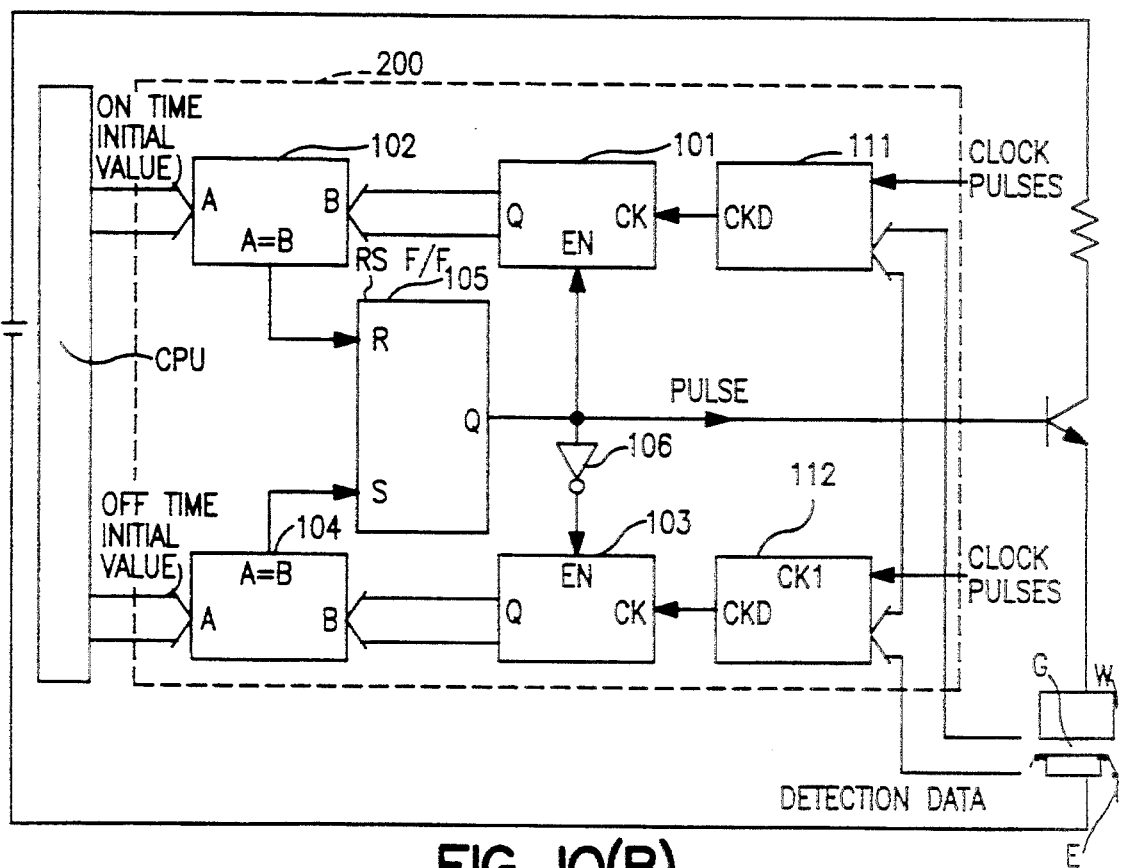
Figure 10C:
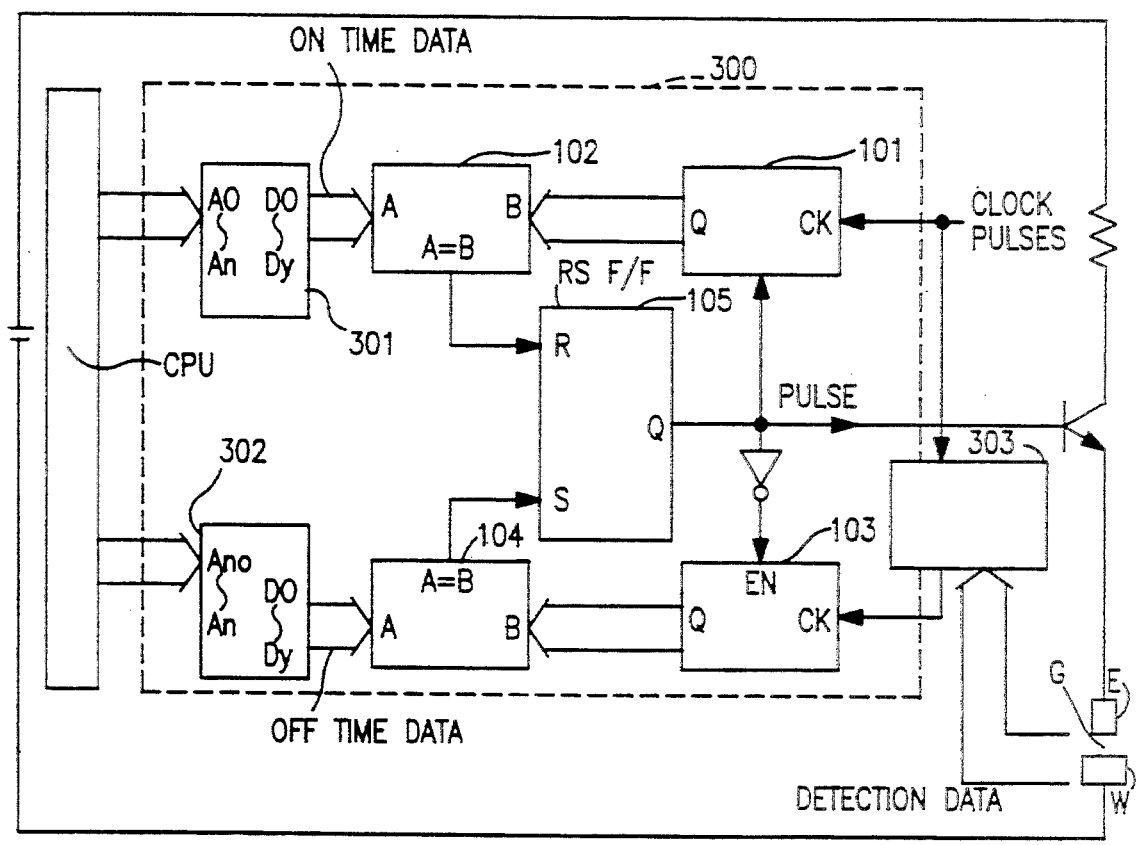

A general flowchart of the operation of the embodiment illustrated is illustrated in FIG. 5. The initial values of ON time and OFF time and program data are written into the appropriate registers in memory 10 in step S10. The initial values and the program data are then sent to the ON/OFF time calculator 30 at step S20. At step S30, the program data is sent to the diagnosis unit 20. The diagnosis unit then receives the programmed detection data, evaluates the data, and then outputs the diagnostic signal to the ON/OFF time calculator 30 at step S40. At step S50, the ON/OFF time calculator 30 controls the ON time data and OFF time data according to the programmed data and the diagnostic signal. The ON/OFF time calculator 30 then sends the ON and OFF time data to the pulse generator 40. The pulse generator 40 then generates machining pulses, which are applied to the gap to cause electric discharge, according to the ON time data and OFF time data at step S60.

The timing chart of FIG. 6 illustrates an example of the time relationship between the gate signal (A), check pulses (D) and (E), inhibit signal (F), F-signal (I), and B-signal (J). In this example, the gap voltage (B) is selected through port A and serves as the detected data for both ON time control and OFF time control. The thresholds for ON time control and OFF time control in trace (B) are 25 volts and 19 volts, respectively. A value above the threshold is deemed "acceptable" and, in the example illustrated, ON clamp is used. The inhibit signal is programmed to have a duration as illustrated in trace (F). The check pulses are programmed to have the positions of CT on and CT off as illustrated in traces (D) and (E).

Upon the rising edge of the gate signal (A) the gap voltage (B) begins to rise. The gap voltage (B) takes a certain time to rise to its no-load voltage level because of inherent delays. Since it is undesirable to sample the gap voltage during this time, the inhibit signal generator 24 generates the inhibit signal (F) to inhibit evaluations during this time. Thus, the F-signals (I) and B-signals (J) are prevented from being generated even if a check pulse is received. Reliability of machining is thus improved.

After the programmed time period of CT on, the check pulse for ON time is generated. When the ON time check pulse (D) is generated, the detected data of gap voltage is compared to the set threshold level by threshold settor 22. In this case, the gap voltage (B) is above the threshold at the time of the check pulse (D) and an F-signal (I) is thereby created. Also, the gap voltage (B) is compared to the threshold for OFF time when the check pulse for OFF time (E) is generated a programmed time period CT off after the falling edge of the machining start signal. In this case, the gap voltage (B) is below the threshold for OFF time so a B-signal (J) is generated. Since the check pulses for ON time and check pulses for OFF time may be programmed independently, the state of machining may be evaluated more precisely.

FIG. 7 illustrates an example of the time relationship within the ON time decision maker 50. The program data, for example, sets the initial value for ON time of the gate signal (A) to 30 $\mu$s, the increment value to 5 $\mu$s, the decrement value to 20 $\mu$s, the duration of the inhibit signal to 3 $\mu$s, the upper limit for ON time to 100 $\mu$s, and the lower limit of ON time to 5 $\mu$s. The gap voltage (B) is selected as the detected data and a value above the threshold is deemed to be acceptable. The ON time increment/decrement/reset mode signal (C) is chosen for the control of the ON time. Also, the F-signal continuous value mode is selected for increment control, B-signal continuous value mode is selected for decrement control, and B-signal accumulated value mode is selected for reset control. Additionally, the continuous value of the F-signal is set to 1, the continuous value of the B-signal is set to 1, the sampling times to 10, and the accumulated value of the B-signals to 3.

With the above example, and as illustrated in FIG. 7, every time the gap voltage is above the threshold level when a check pulse (E) is generated, an F-signal (F) is generated which results in an UP signal (H) being generated. Also, every time the gap voltage (B) is below the threshold when a check pulse (E) is generated, a B-signal (G) is generated which results in a DO signal being generated (I). Also, when three B-signals (G) are generated within the 10 sampling times, a RE signal (J) is generated.

FIG. 8 illustrates an example of the timing relationships within the ON/OFF time calculator 30 for ON time control. For the timing chart of FIG. 8, the time increment is set to 10 μs, the time decrement to 7 μs, the upper limit to 55 μs, and the lower limit to 5 μs.

With the above-recited settings, when an UP signal is generated as a diagnostic signal (B), the increment of 10 μs is added to the ON time (A). When a DO signal is generated as a diagnostic signal (B), the decrement of 7 μs is subtracted to the ON time (A), and when a RE signal is generated as a diagnostic signal (B), the ON time is reset to the initial value of ON time (A). Additionally, the ON time (A) is set to the upper or lower limits of ON time when an addition or subtraction will yield a result above or below the limits, respectively. The OFF time control is similarly controlled.

FIG. 9(A) illustrates an example of the logic circuit programmed for copper-steel machining and FIG. 9(B) illustrates an example of the logic circuit programmed for copper-titanium machining. In the figures, "Add." represents the hexidecimal address of the data and "Set" represents the decimal value of the data stored in the associated address. According to the variable, the decimal values correspond to time in 100 ns, the actual number of times, or actual number of volts. The gap voltage is provided through port A for the detection data.

In the logic circuit for copper-steel machining as shown in FIG. 9(A), for example, the initial ON time is set to 7 μs, the initial OFF time to 7 μs, both the ON time control and OFF time control are enabled, the increment of ON time is set to 200 ns, and the increment of OFF time to 500 ns.

Although not illustrated, other logic circuits, in the form of PCB memory cards, or through variations from the artisan, provided with programming data for other types of machining may be available. Also, the basic operation of the pulse generator 2 is the same regardless of the logic circuits used, even though a hardware may be operated any one of a plurality of logic circuits. The logic circuits, however, allow the pulse generator 2 to modify its operation to best suit the particular machining being performed. As is apparent from the design, the pulse control may be responsive to additional machining parameters by adding additional program data or logic circuits.

The pulse generator 2 is adaptable to a multitude of different machining methods with a single hardware design. Thus, no additional hardware is necessary to accommodate different machining situations. Also, in accordance to the present invention, the pulse generator 2 can provide optimal control of the machining pulses in accordance with the actual workpiece material, the actual electrode material, and flushing conditions. The actual machining situation is thus more accurately controlled resulting in improved machining rates. Advantages of the present invention include the programmability of the machine according to the actual machining requirements and the flexibility in the detection and diagnosis of the machining conditions.

Further, in a conventional pulse generator, when the machining condition has been diagnosed as being unacceptable, the OFF time is extended while the ON time remains fixed at its initial condition. After the OFF time has been extended to its longest time, the ON time is then shortened. With the present invention, however, the ON time and OFF time are controlled independently. With optimal independent control of both the ON time and OFF time, the pulse may be more appropriately controlled for the actual machining conditions occurring.

An additional advantage is that the program data may be changed if necessary. Besides storing the program data, the memory 10 may store additional program data which can be modified during machining. For example, the program may be set so that a machining requirement becomes changed after a block of the program has been executed. In other words, after machining has progressed to a certain stage, the CPU 1 may automatically transfer new data into the memory 10 for subsequent machining stages. Also, the transfer of data into the memory 10 may be dependent upon the state of the machining parameters, such as the machining depth, fluid flushing state, etc. Further, when an operator modifies the program data during the progress of machining, the memory 10 will accordingly be updated to reflect the modifications.

When a diagnostic signal continuously requires the increase in the OFF time, the actual machining requirements may not correspond with the diagnosed results. In this situation, it may be desirable to have the program data modified, for example, by feeding back the diagnosed results to the CPU 1, which would then modify the data. As will be apparent to one of skill in the art, such feedback may be performed with standard feedback control or with fuzzy logic control.

Moreover, although examples of the present invention have been used with electric machining, the pulse generator is also applicable to other uses, such as with laser machining or with motor control.

Figure 11:
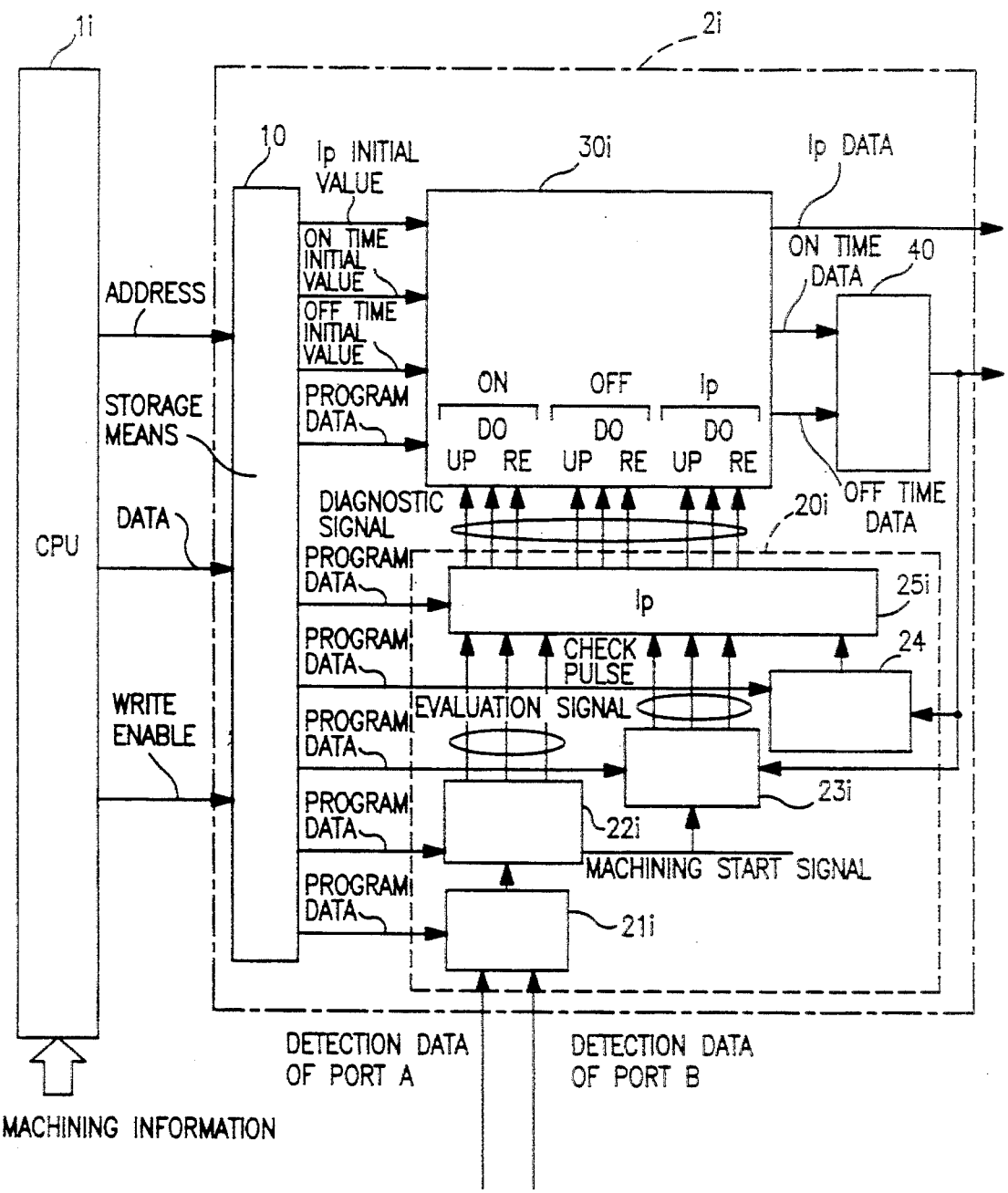
FIG. 11 illustrates an additional embodiment of a pulse generator according to the present invention.

FIG. 11 illustrates another embodiment of the invention in which the peak current of the pulses are additionally controlled. In FIG. 11, an "i" attached to the reference numeral of an element symbolizes that the element is similar to the first embodiment but that an additional function is added for the control of the peak current Ip.

FIGS. 12(A), (B), and (C) are examples of memory maps of the additional programming which are advantageously used with the embodiment of FIG. 11. The programming of FIG. 12(A) represents exemplary additions to the programming illustrated in FIG. 3(A). Similarly, the programming of FIG. 12(B) represents exemplary additions to the programming of FIG. 3(C), and the programming of FIG. 12(C), additions to the programming of FIG. 3(D).

As shown in FIG. 12(A), the program sets the initial value of the peak current Ip, a value for incrementing peak current, a value for decrementing peak current, an upper limit of peak current, and a lower limit for peak current. The program also has one bit at an address of 76 for enabling or disabling the use of the current control.

The programs illustrated in FIG. 12(B) and FIG. 12(C) contain data that is transferred to the diagnostic unit 20i from the memory 10i. As shown in FIG. 12(B), the program includes data for the setting of the Ip control mode, the continuous value of F-signals, the continuous value of B-signals, the accumulated value of F-signals, the accumulated value of B-signals, the sampling times, the mode for Ip increment control, the mode for Ip decrement control, the mode for Ip reset control, and the positioning of the Ip check pulse. The program in FIG. 12(C) includes data for the setting of the threshold for Ip control, the detected data for Ip control, and the evaluation for Ip control.

In the pulse generator 2i of FIG. 11, a memory 10i provides the initial peak value of current to a calculator 30i. A diagnostic unit 20i provides the diagnostic signal for the control of the peak current Ip. The calculation unit 30i contains logic circuitry for the changing of the Ip data, as well as logic circuitry for the modifying of ON time and OFF time.

The pulse generator 2i receives, for example, address, data, and write enable signals from CPU 1i. FIGS. 12(A), (B), and (C) illustrate the examples of the additional data that may be stored into memory 10i for the control of the peak current Ip. The diagnosis unit 20i is further comprised of detection data selector 21i, threshold setting means 22i, check pulse generator 23i, inhibit signal generator 24, and decision circuit 25i.

Figure 13A:
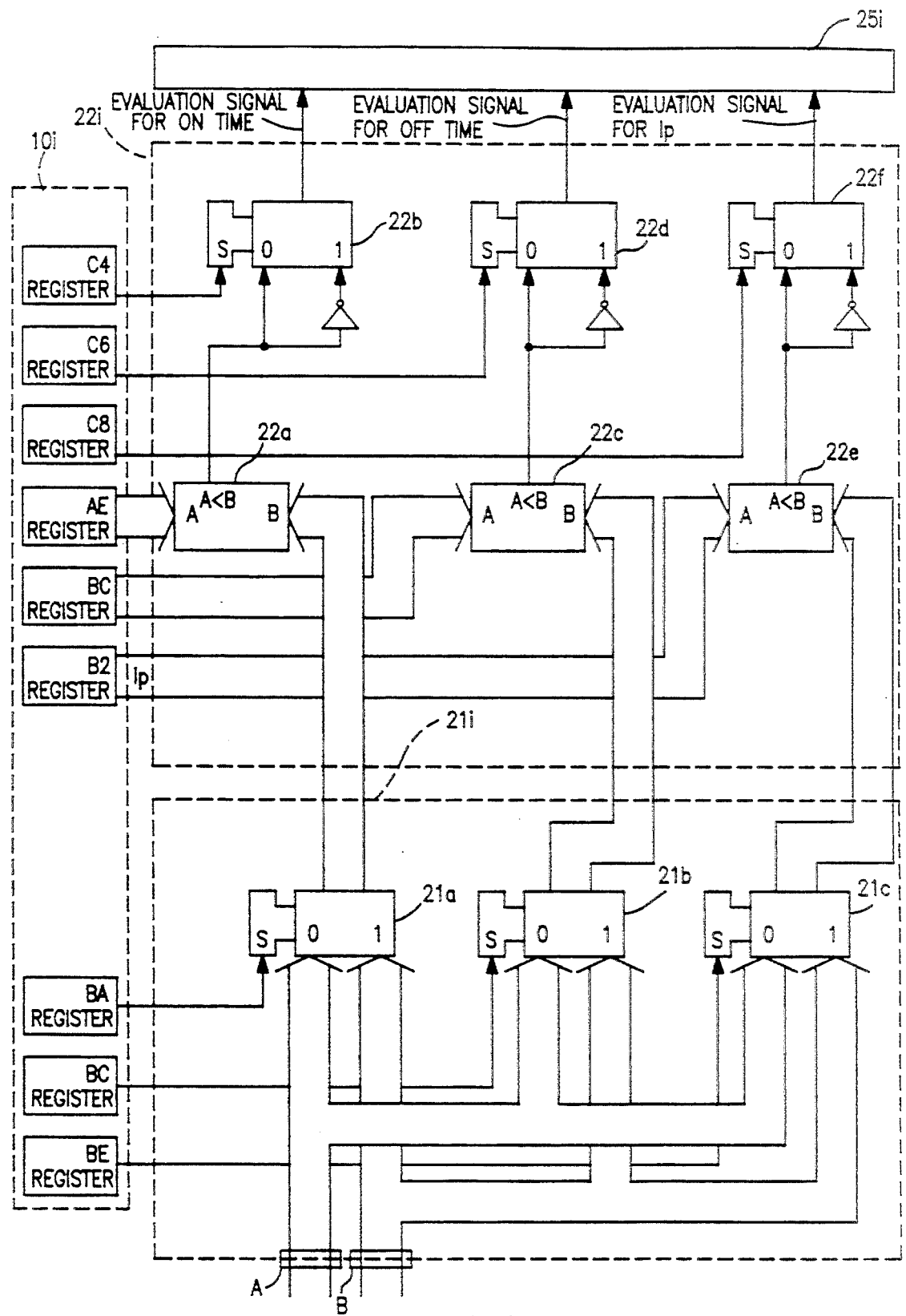
FIGS. 13(A) to (C) are diagrams illustrating details of pulse generator of FIG. 11.

As shown in FIG. 13(A), the detection data selector 21i includes a selector 21c which selects the detected data according to the program data stored in register BE. The detected data is used in the evaluation of the peak current. The data detected for the peak current is sent to the threshold setting means 22i, which has an additional comparator 22e for comparing the detected data, for example the gap current, with a threshold set by register B2. An additional selector 22f is also provided in threshold setting means 22i for providing an evaluation signal on the peak current Ip.

Figure 13B:
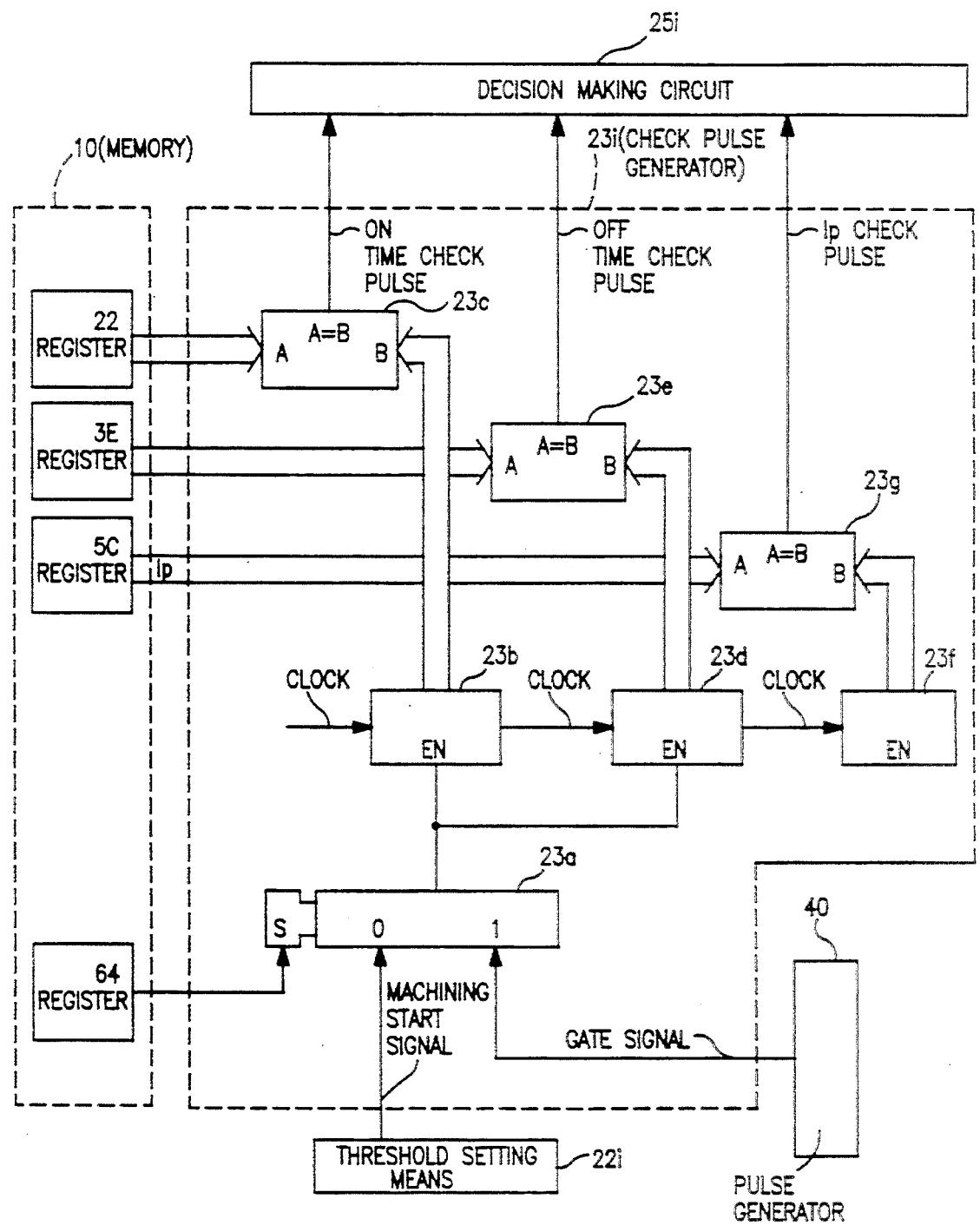

As shown in FIG. 13(B), the check pulse generator 23i is further provided with a counter 23f for counting the clock pulses. A comparator 23g provides a check pulse signal to the decision circuit 25i for the peak current Ip when the count from counter 23g equals the delay stored in register 5C for the peak current check pulse. The decision circuit 25i is also provided with an Ip decision maker which has a configuration similar to the ON time decision maker 50. The Ip decision maker generates a diagnostic signal for the peak current Ip, independently of the ON time and OFF time, based upon the evaluation signal, Ip, check pulse, and inhibit signal.

Figure 13C:
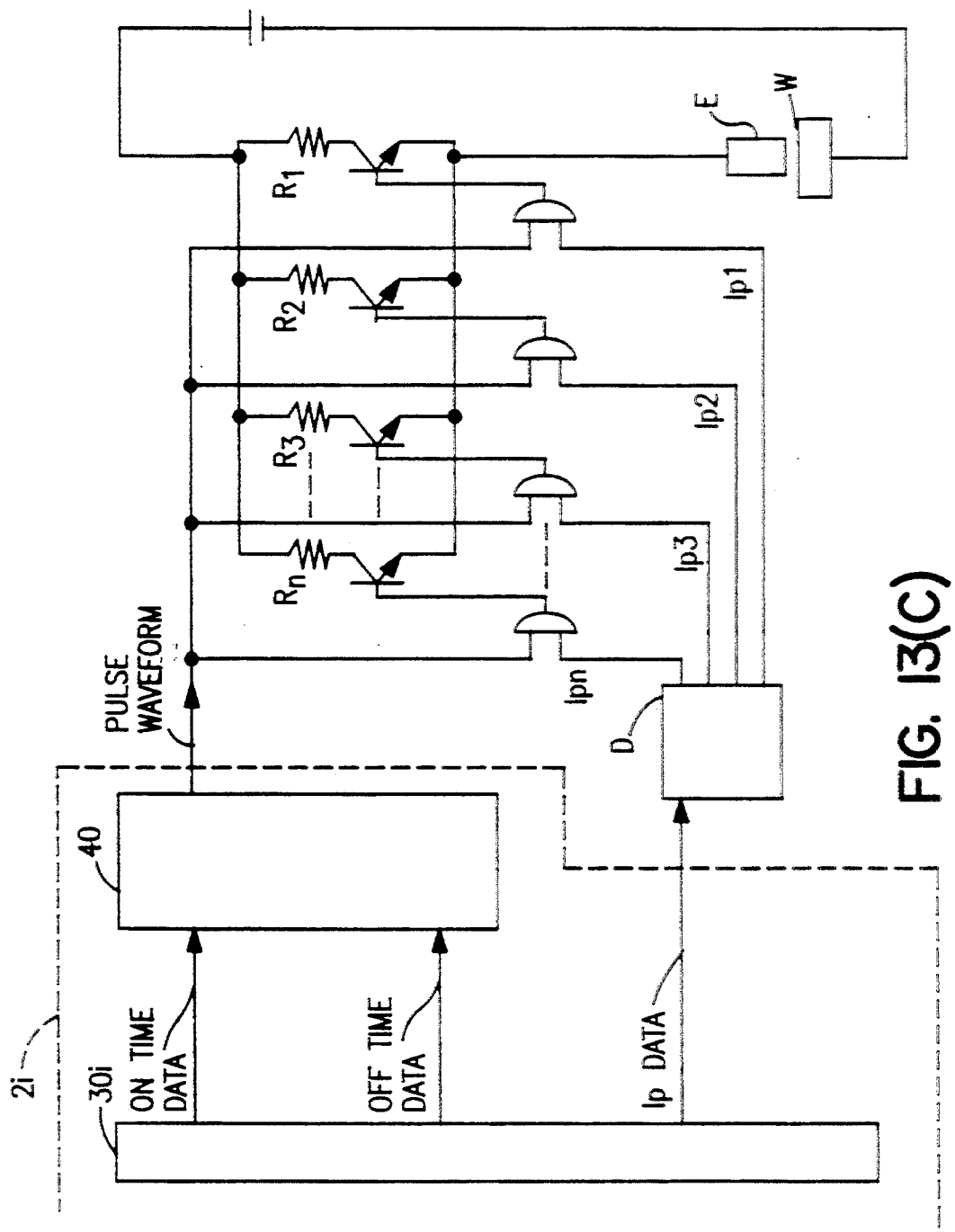

The calculator 30i is additionally provided with an Ip calculator, which has a substantially similar configuration to that of the ON time calculator 70 and OFF time calculator 80. In the example illustrated in FIG. 13(C), the calculator 30i provides the pulse generator 40 with the ON time data and the OFF time data and provides the Ip data to a decoder D. The decoder D is connected to a plurality of AND gates through a plurality of lines Ip1, Ip2, Ip3, ... Ipn, respectively. Each AND gate has its other input connected to the output of the pulse generator 40. The output of the AND gates are respectively connected to the bases of a plurality of transistors. Each transistor has its collector connected to the DC power source through a resistor R1, R2, R3, ... Rn and its emitter connected to the electrode at the gap. The plurality of transistors, with their respective resistors, are all connected in parallel to each other.

The decoder D selectively provides output signals on lines Ip1, Ip2, Ip3, ... Ipn according to the Ip data received from the calculator 30i. The resistors R1, R2, R3 ... Rn associated with the transistors have varying magnitudes. This enables the peak current flowing through the gap to be selectively controlled. Thus, for example, if an output is provided on one of the lines, Ip1 for example, the associated transistor is turned on resulting in an amount of current through the gap which is determined by magnitude of the resistor. Therefore, the peak current may be increased or decreased by turning on or off one or more of the transistors.

The flow chart for the embodiment including the control of peak current is substantially the same as the one illustrated in FIG. 5. With the embodiment of FIG. 11, the Ip data would also be stored in the memory 10i in step S10, the initial value of Ip would also be sent to the calculator 30i in step S20. In step S30, Ip data would also be sent to the diagnostic unit 20i and the diagnostic unit 20i would also evaluate and provide a diagnostic signal for the peak current Ip. In step S50, the calculator would also output Ip data to the pulse generator 40 and at step S60 the pulse generator would also generate the pulse according to the Ip data.

As with the first embodiment, the data to be detected by detection data selector 21i, the thresholds set by threshold settor 22i, the duration of the inhibit signals generated by inhibit signal generator 24, the check pulses generated by check pulse generator 23i, the diagnostic signals generated by decision circuit 25i, and the data for ON time, OFF time, and peak current Ip provided by calculator 30i are all programmable.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention only be limited by the claims appended hereto.

We claim:

1. A method for generating a train of successive pulses having an ON time and an OFF time using a programmable information processing device for receiving process information settings and for storing a plurality of sets of data, including initial ON time values, initial OFF time values, and program data, including diagnostic criteria, and ON time/OFF time calculation criteria, said pulses being applied to effect a process, said method comprising the steps of:

inputting process information settings for carrying out said process to said programmable information processing device;

outputting data from said programmable information processing device, to a pulse generating device, said data including an initial ON time value, an initial OFF time value and program data, including diagnostic criteria and ON time/OFF time calculation criteria for carrying out said process;

generating a process information signal, indicative of the state of at least one characteristic of the process to which said pulses are applied;

generating a diagnostic signal using said diagnostic criteria based on said program data and said process information signal;

varying the duration of ON time from said initial ON time value or the duration of OFF time from said initial OFF time value using said ON time/OFF time calculation criteria based on said diagnostic
signal and said program data; and generating a pulse based on said ON time duration
and said OFF time duration.

2. The method of claim 1 wherein said step of generating a process information signal further comprises the step of providing at least two detection data signals indicative of the status of at least two characteristics of the process to which said pulses are applied and selecting at least one of said detection data signals as said process information signal.

3. The method of claim 2 wherein said step of generating said diagnostic signal comprises the steps of generating an evaluation result by evaluating said at least one detection data signal;

reading said evaluation result at a time determined by said program data; and processing said evaluation result according to said program data to generate said diagnostic signal.

4. The method of claim 3, wherein said program data further comprises electroerosion machining conditions for controlling the working process and wherein said program data for each of said evaluation results causes said step of processing said evaluation result to be performed by counting either a continuous number of evaluation results which are desirable, or a continuous number of evaluation results which are undesirable, or a number of accumulated evaluation results which are desirable, or by counting the number of accumulated evaluation results which are undesirable.

5. The method of claim 1, wherein said process information settings relate to electroerosion machining conditions and said step of inputting information for carrying out said process comprises the step of inputting one or more machining parameters from the group consisting of: the method of machining, the material used as a workpiece, the material used as an electrode, the type of flushing used, the type of fluid used, the desired material removal rate, the desired electrode wear rate, and the desire surface roughness.

6. The method of claim 1, wherein said process information settings relate to machining gap conditions in an electroerosion machine and comprises gap current data and gap voltage data.

7. A pulse generating apparatus for generating a train of successive pulses having an ON time and an OFF time, said pulses being applied to effect a process, said apparatus comprising:

a programmable information processing device for setting information for carrying out the process and for storing data, said data including a plurality of sets of data for selecting a pulse generating mode for carrying out said process, including initial ON time values, initial OFF time values, diagnostic criteria, and ON time/OFF time calculation criteria, and a pulse generating means for receiving said data from said programmable information processing device and for outputting pulses, said pulse generating means including:

(i) memory means, responsive to said data for outputting an initial value for ON time, an initial value for OFF time and program data;

(ii) means for inputting a process information signal, indicative of the status of at least one characteristic of the process to which said pulses are applied;

(iii) programmable means responsive to said program data including said diagnostic criteria and said process information signal for generating a diagnostic signal;

(iv) programmable means responsive to said diagnostic signal and said program data, including said ON time/OFF time calculation criteria, for varying the duration of said ON time from said initial ON time and/or the duration of said OFF time from said initial OFF time; and (v) means, responsive to said programmable means for varying ON and OFF time duration and for generating a pulse having an ON time and OFF time based on said diagnostic signal and said program data.

8. The apparatus of claim 7, wherein said process information settings relates to electroerosion machining conditions and is selected from the group consisting of: the method of machining used, the material used as a workpiece, the material used as an electrode, the type of flushing used, the type of fluid used, the desired removal rate, the desired electrode wear rate, and the desired surface roughness.

9. The apparatus of claim 7 wherein said process information relates to machining gap conditions in an electroerosion machine and comprises gap current data and gap voltage data.

10. The apparatus of claim 7 wherein said programmable means for generating said diagnostic signal further comprises:

detection data selecting means for selecting, in accordance with said diagnostic criteria, at least one signal of detection data out of a plurality of detection data signals,each being indicative of information regarding the status of a characteristic of the process to which said pulses are applied;

threshold setting means for generating an evaluation result by comparing the selected signal of detection data with a threshold set in accordance with said diagnostic criteria;

check pulse generating means for generating a check pulse in accordance with said diagnostic criteria;

inhibit signal generating means for generating an inhibit signal in accordance with said diagnostic criteria; and processing means for generating said diagnostic result of the machining state by reading said evaluation result at a time determined by said check pulse and said inhibit signal and processing said evaluation result in accordance with said diagnostic criteria.

11. The apparatus of claim 10, wherein said program data further comprises electroerosion machining conditions for controlling the machining process and wherein said program data for each of said evaluation results causes said processing means to generate said diagnostic signal by counting either in a first mode the continuous number of evaluation results which are desirable, in a second mode the continuous number of evaluation results which are undesirable, in a third mode the number of accumulated evaluation results which are desirable, or in a fourth mode the number of accumulated evaluation results which are undesirable.

12. A method for generating a train of successive pulses having an ON time and an OFF time using a programmable information processing device for receiving machining process information and for storing a plurality of sets of machining data, including initial ON time values, initial OFF time values, initial peak current values, and program data including diagnostic criteria, ON time/OFF time calculation criteria and peak current calculation criteria, said pulses being applied to effect a machining process across a machining gap, said method comprising the steps of:

inputting machining information for effecting said machining process to said programmable information processing device;

outputting data selected in accordance with said machining process information from said programmable information processing device, said data including an initial ON time value, an initial OFF time value, an initial value of peak current and program data;

generating a machining gap information signal indicative of at least one characteristic of said machining gap;

generating a diagnostic signal based on said diagnostic criteria and machining gap information signal;

varying the duration of ON time from said initial ON time value, the duration of said OFF time from said initial OFF time value and the magnitude of peak current from said initial peak current value using said ON time/OFF time criteria and said peak current criteria and based on said diagnostic signal and said program data; and generating a pulse based on the duration of ON time, the duration of OFF time and the magnitude of peak current.

13. The method of claim 12, wherein said machining information relates to electroerosion machining conditions and said step of inputting machining information comprises the step of inputting one or more machining parameters from the group consisting of: the method of machining, the material used as a workpiece, the material used as an electrode, the type of flushing used, the type of fluid used, the desired material removal rate, the desired electrode wear rate, and the desired surface roughness.

14. The method of claim 12 further comprising the step of providing at least two signals of detection data, each indicative of the status of a characteristic of said machining gap and wherein the step of generating a machining gap information signal further comprises the step of selecting at least one of said detection data signals.

15. The method of claim 14 wherein said step of generating said diagnostic signal comprises the steps of:

generating an evaluation result by evaluating said at least one detection data signal;

reading said evaluation result at a time determined by said program data; and processing said evaluation result according to said program data to generate said diagnostic signal.

16. The method of claim 15, wherein said program data further comprises electroerosion machining conditions for controlling the machining process and wherein said program data for each of said evaluation results causes said step of processing said evaluation result to be performed by counting either a continuous number of evaluation results which are desirable, or a continuous number of evaluation results which are undesirable, or by counting a number of accumulated evaluation results which are desirable, or a number of accumulated evaluation results which are undesirable.

17. A pulse generating apparatus for generating a train of successive pulses having an ON time and OFF time said pulses being applied to effect a machining process across a machining gap, said apparatus comprising:

a programmable processing device for inputting information for carrying out the machining process and for storing data, said data including a plurality of sets of data for selecting a pulse generating mode according to the information input to said programmable processing device to carry out said machining process, said sets of data including initial ON time values, initial OFF time values, diagnostic criteria, ON time/OFF time calculation criteria and peak current calculation criteria;

a pulse generating means responsive to the data from said programmable processing device for outputting pulses, said pulse generating means comprising:

(i) a memory means, responsive to said data, for outputting an initial value for ON time, an initial value for OFF time, an initial value for peak current and program data;

(ii) means for inputting a machining gap information signal indicative of the status of at least one characteristic of the machining process;

(iii) programmable means, response to said program data, including said diagnostic criteria and to said machining gap information signal for generating a diagnostic signal;

(iv) programmable means responsive to said diagnostic signal, said program data, said ON time/OFF time calculation criteria, said initial value of ON time, said initial value of OFF time and said peak current calculation criteria for varying the ON time duration data, OFF time duration data and/or peak current data; and (v) means responsive to said data for ON time and OFF time for generating a pulse having an ON time and OFF time based on said diagnostic signal and said program data.

18. The apparatus of claim 17, wherein said machining information relates to electroerosion machining conditions and is selected from the group consisting of: the method of machining used, the material used as a workpiece, the material used as an electrode, the type of flushing used, the type of fluid used, the desired removal rate, the desired electrode wear rate, and the desired surface roughness.

19. A pulse generating apparatus as set forth in claim 17 wherein said programmable means for generating said diagnostic signal further comprises:

detection data selecting means for selection, in accordance with said diagnostic criteria, at least one signal of detection data out of a plurality of signals of detection data, each indicative of the status of a characteristic of said machining gap during said machining process;

threshold setting means for generating an evaluation result by comparing the selected signal of detection data with a threshold set in accordance with said diagnostic criteria;

check pulse generating means for generating a check pulse in accordance with said diagnostic criteria;

inhibit signal generating means for generating an inhibit signal in accordance with said diagnostic criteria;

processing means for generating said diagnostic result of the process state by reading said evaluation result at a time determined by said check pulse and said inhibit signal and processing said evaluation result in accordance with said diagnostic criteria.

20. The apparatus of claim 19, wherein said program data further comprises electroerosion machining conditions for controlling the machining process and wherein said program data for each of said evaluation results causes said processing means to generate said diagnostic signal by counting in a first mode the continuous number of evaluation results which are desirable, in a second mode the continuous number of evaluation results which are undesirable, in a third mode the number of accumulated evaluation results which are desirable, or in a fourth mode the number of accumulated evaluation results which are undesirable.

21. A pulse generating apparatus for generating a train of successive pulses having an ON time and an OFF time, said pulses being applied to effect a process, said apparatus comprising:

a programmable processing device for setting information for carrying out the process and for storing a plurality sets of data, including data for selecting a pulse generating mode, initial ON time values, initial OFF time values, diagnostic criteria, and ON time/OFF time calculation criteria, and for providing one of the plurality sets of data each time a set of information for carrying out the process is received; and a pulse generating device connected to receive one of the plurality sets of data from said programmable processing device, said pulse generating device further comprising:

means for storing one of the plurality sets of data from said programmable processing device and for outputting an initial ON time value, an initial OFF time value and program data;

means for generating a process information signal indicative of the status of at least one characteristic of the process to which said pulses are applied;

programmable means for processing said process information signal based on said program data, including said diagnostic criteria, to thereby generate a diagnostic signal;

programmable means, responsive to said diagnostic signal, for varying the duration of said ON time from said initial ON time value and/or the duration of said OFF time from said initial OFF time value based on said program data; and pulse generating means, responsive to said programmable means for varying ON time and OFF time, for generating a pulse having an ON time and OFF time.

* * * * *